United States Patent [19]
Kubo et al.

[11] Patent Number: 5,701,165
[45] Date of Patent: Dec. 23, 1997

[54] PROJECTION-TYPE LIQUID CRYSTAL DISPLAY WITH A LIQUID CRYSTAL PANEL HAVING A REFLECTION-REDUCING COATING LAYER

[75] Inventors: Masumi Kubo, Nara; Yasunobu Akebi, Yamabe-gun; Toshihiro Yamashita, Nara, all of Japan

[73] Assignee: Sharp Kabushiki Kaisha, Osaka, Japan

[21] Appl. No.: 468,654

[22] Filed: Jun. 6, 1995

[30] Foreign Application Priority Data

Jul. 5, 1994 [JP] Japan .................. 6-153877
Dec. 19, 1994 [JP] Japan .................. 6-315334

[51] Int. Cl.$^6$ .................................. G02F 1/1335
[52] U.S. Cl. .................................. 349/5; 349/137
[58] Field of Search .................................. 354/40, 41, 42, 354/67, 59, 74, 79; 349/5, 8, 110, 122, 137

[56] References Cited

U.S. PATENT DOCUMENTS 5,414,547  5/1995  Matsuo et al. .................. 359/59

FOREIGN PATENT DOCUMENTS 3515225  10/1985  Germany .
2-195381  8/1990  Japan .
4-100002  4/1992  Japan .
4-104244  4/1992  Japan .

*Primary Examiner*—William L. Sikes
*Assistant Examiner*—James A. Dudek

[57] ABSTRACT

A projection-type liquid crystal display is provided with an image-outputting section which includes a liquid-crystal panel. On the light-releasing side of the liquid crystal panel, an active-matrix substrate and a polarizing element are bonded to each other with a bonding material that has virtually the same refractive index as that of these members so as to reduce internal reflection on the light-releasing surface of the active-matrix substrate and external reflection on the light-incident surface of the polarizing element. Further, a reflection-reducing coating layer is formed on the light-releasing surface of the light-releasing-side polarizing element to reduce internal reflection on the light-releasing surface of the polarizing element.

23 Claims, 28 Drawing Sheets

PROJECTION-TYPE LIQUID CRYSTAL DISPLAY WITH A LIQUID CRYSTAL PANEL HAVING A REFLECTION-REDUCING COATING LAYER

FIELD OF THE INVENTION

The present invention relates to a projection-type liquid crystal display which displays image signals released from a liquid crystal panel on a wide screen in a enlarged manner.

BACKGROUND OF THE INVENTION

A conventional projection-type liquid crystal display has an arrangement, for example, as shown in FIG. 26 or FIG. 27. In these arrangements, light rays, released from a light source 71, are incident on an image-outputting section 52 (or an image-outputting section 52') through a UV(Ultraviolet)/IR(Infrared) cut filter 51, and image light signals, outputted from the image-outputting section 52 (or the image-outputting section 52'), are incident on a projection lens 53 and projected to form images on a screen, not shown.

Each of the image-outputting sections 52 and 52' is constituted of light-incident-side and light-releasing-side polarizing elements 55a and 55b that are respectively placed on the light-incident side and light-releasing side of the liquid crystal panel 54. In the image-outputting section 52, the light-releasing-side polarizing element 55b is placed apart from the liquid crystal panel 54 with an air layer located in between, and in the image-outputting section 52', the light-releasing-side polarizing element 55b is bonded to the light-releasing surface of the liquid crystal panel 54 without an air layer. In both of the image-outputting sections 52 and 52', the light-incident-side polarizing element 55a is placed apart from the liquid crystal panel 54 with an air layer located in between in order to avoid temperature rises of the liquid crystal panel 54 due to light-absorption by the light-incident-side polarizing element 55a.

FIG. 28 shows a cross-sectional view of an essential part of the liquid crystal panel 54 in each of the image-outputting sections 52 and 52'. FIG. 29 shows a cross-sectional view of an essential part of a liquid crystal panel section 59 of the image-outputting section 52' wherein the light-releasing-side polarizing element 55b is bonded to the light-releasing surface of the liquid crystal panel 54 by the use of a bonding material 60.

The liquid crystal panel 54 is constituted of an opposing substrate 54a that is placed on the light-incident side and an active-matrix substrate 54b that is placed on the light-releasing side. These substrates are arranged to face each other with a liquid crystal layer 56 sandwiched in between. On the opposing surface of the active-matrix substrate 54b, is formed a semiconductor active device 58 corresponding to each display pixel, and on the opposing surface of the opposing substrate 54a, is formed a light-shading pattern 57 for shading light from the semiconductor active device 58 together with an opposing electrode, not shown. The reason that the opposing substrate 54a is disposed on the light-incident side with the shading pattern 57 formed thereon is because when light is illuminated onto the semiconductor active device 58 formed on the active-matrix substrate 54b, the OFF characteristics are lowered, causing a reduction in contrast. Additionally, the light-shading pattern 57 of this type may be formed on the active-matrix substrate 54b side in a manner covering the semiconductor active device 58.

In the image-outputting section 52 of FIG. 26, however, an air layer is located between the active-matrix substrate 54b (see FIG. 28) in the liquid crystal panel 54 and the light-releasing-side polarizing element 55b. This arrangement causes reflected rays due to the following reflections: internal reflection on the light-releasing surface (the interface between the active-matrix substrate 54b and the air layer) of the active-matrix substrate 54b; external reflection on the light-incident surface (the interface between the air layer and the light-releasing-side polarizing element 55b) of the light-releasing-side polarizing element 55b; and internal reflection of the light-releasing surface of the light-releasing-side polarizing element 55b.

Here, as for light which proceeds from the first medium toward the second medium, when the first and second media that have respectively different refractive indexes are located in contact with each other, reflections, which are exerted on the interface of the two media, are defined as an internal reflection for the first medium and as an external reflection for the second medium.

When these reflected rays are illuminated onto the semiconductor active device 58 of the active-matrix substrate 54b, the semiconductor active device 58 is subjected to a reduction in the OFF characteristics. This causes crosstalk and a reduction in contrast, resulting in problems, such as degradation in the picture quality and difficulty in obtaining good images.

In the case of the image-outputting section 52' shown in FIG. 27, the light-releasing-side polarizing element 55b is bonded to the liquid crystal panel 54. Therefore, although internal reflection occurs on the light-releasing surface (the interface between the light-releasing-side polarizing element 55b and the air layer) of the light-releasing-side polarizing element 55b, neither internal reflection on the light-releasing surface of the active-matrix substrate 54b, nor external reflection on the light-incident surface of the light-releasing-side polarizing element 55b, occurs. However, especially in those projection-type liquid crystal displays wherein a compact, high-accuracy liquid crystal panel having minute display pixel elements is used as the liquid crystal panel 54, the light-shading pattern formed on the opposing substrate tends to become small, failing to provide a sufficient light-shading effect. Therefore, even only the reflected rays, caused by the internal reflection on the light-releasing surface of the light-releasing-side polarizing element 55b, tend to cause a reduction in the OFF characteristics of the semiconductor active device 58, resulting in problems, such as crosstalk and degradation in the picture quality due to a reduction in contrast.

In addition, in the case of the image-outputting section 52 shown in FIG. 26 as well as the image-outputting section 52' shown in FIG. 27, dust and scratches on the light-releasing surface of the active-matrix substrate 54b or on the light-incident surface of the opposing substrate 54a, as well as defects such as scratches and flaws contained in the light-releasing-side polarizing element 55b, tend to be focused to form images on a screen or other places by the projection lens 53. This also causes degradation in the picture quality.

Here, as shown in FIGS. 30 and 31, Japanese Laid-Open Patent Publication 100002/1992 (Tokukaihei 4-100002) has disclosed an arrangement wherein a reflection-reducing coating 61 is laid on the light-incident surface of each of the light-incident-side and light-releasing-side polarizing elements 55a and 55b as well as another arrangement wherein the reflection-reducing coatings 61 are laid on the light-incident and light-releasing surfaces of each of the light-incident-side and light-releasing-side polarizing elements 55a and 55b. These arrangements are intended to prevent external reflection and internal reflection which occur on the element surfaces of the light-incident-side polarizing element 55a and the light-releasing-side polarizing element 55b that are respectively disposed on the light-incident and light-releasing sides of the liquid crystal panel 72, thereby preventing a reduction in the light transmittance due to the loss from reflection.

Moreover, Japanese Laid-Open Patent Publication 104244/1992 (Tokukaihei 4-104244) has disclosed an arrangement wherein a unit, which is made by affixing a polarizing element that constitutes a light-incident-side polarizing element or a light-releasing-side polarizing element to an optical element on which a reflection-reducing coating is laid, is bonded to the surfaces on the light-incident side and the light-releasing side of the liquid crystal panel. This arrangement is intended to prevent external reflection and internal reflection which occur on the surfaces on the light-incident side and the light-releasing side of the liquid crystal panel as well as on the element surfaces of the light-incident-side polarizing element and the light-releasing-side polarizing element, thereby preventing a reduction in the light transmittance due to the loss from reflection.

Furthermore, Japanese Laid-Open Patent Publication 195381/1990 (Tokukaihei 2-195381) has disclosed an arrangement of a liquid-crystal panel module wherein glass blocks are bonded to the surfaces on the light-incident side and the light-releasing side of a liquid crystal panel such that the surface of the liquid-crystal panel module is located outside the depth of focus of the projection lens. This arrangement is intended to prevent dust adhering to the surfaces on the light-incident side and the light-releasing side of the liquid crystal panel from being focused to form its image on a screen or other places by the projection lens.

SUMMARY OF THE INVENTION

The first objective of the present invention is to provide a projection-type liquid crystal display which is capable of reducing internal reflection or external reflection that occurs on the interface inside the liquid-crystal panel provided in the projection-type liquid crystal display or on the interface of the polarizing plate added to the liquid-crystal panel and improving the OFF characteristics of a semiconductor active device that drives each pixel in the liquid-crystal panel. Thus, the projection-type liquid crystal display can suppress crosstalk and a reduction in contrast, thereby providing good images with high picture quality.

The second objective of the present invention is to provide a projection-type liquid crystal display which is capable of preventing defects, such as scratches and flaws on the surface of the liquid-crystal panel provided in the projection-type liquid crystal display and scratches and flaws on the surface of the polarizing plate added to the liquid-crystal panel, from being focused to form their images on the screen, thereby providing good images with high picture quality.

The third objective of the present invention is to provide a projection-type liquid crystal display which is easily manufactured with high yield and is also capable of providing good images with high picture quality.

In order to achieve the first objective, the present invention is applied to a projection-type liquid crystal display which has a liquid-crystal panel that is constituted of an active-matrix substrate having semiconductor active devices formed thereon, an opposing substrate having opposing electrodes formed thereon, and a liquid crystal layer sandwiched therebetween, and which allows light rays to be incident on the liquid-crystal panel from the opposing substrate side, as well as allowing light rays released from the liquid-crystal panel to pass through a projection lens, so that images displayed on the liquid-crystal panel are projected in an enlarged manner. The projection-type liquid crystal display of the present invention is characterized by including the following components.

(1) a shading pattern which is formed in the liquid-crystal panel and which shields the light rays that have been incident on the liquid-crystal panel so that they are not directly incident on the semiconductor active devices formed on the active-matrix substrate;

(2) a light-releasing-side polarizing element having a plate shape which is installed in a manner adhering to the light-releasing surface of the active-matrix substrate; and (3) an anti-reflection section formed on the light-releasing surface of the light-releasing-side polarizing element.

With the above-mentioned arrangements, the light-releasing-side polarizing element and the active-matrix substrate in the liquid-crystal panel are kept closely in contact with each other and no air layer exists between the light-releasing-side polarizing element and the liquid-crystal panel; therefore, it is possible to positively reduce internal reflection on the light-releasing surface of the active-matrix substrate and external reflection on the light-incident surface of the light-releasing-side polarizing element.

Further, the anti-reflection section, which is formed on the light-releasing surface of the light-releasing-side polarizing element, positively reduces internal reflection on the light-releasing surface of the light-releasing-side polarizing element.

Consequently, the semiconductor active device, formed on the active-matrix substrate, becomes less susceptible to the reduction in the OFF characteristics, and it is possible to suppress crosstalk and a reduction in contrast. Therefore, even in the case of a compact, high-definition liquid crystal panel with minute display pixel electrodes, it is possible to provide good images with high picture quality.

In order to achieve the second objective, the present invention is applied to a projection-type liquid crystal display which has a liquid-crystal panel that is constituted of an active-matrix substrate having semiconductor active devices formed thereon, an opposing substrate having opposing electrodes formed thereon, and a liquid crystal layer sandwiched therebetween, and which allows light rays to be incident on the liquid-crystal panel from the opposing substrate side, as well as allowing light rays released from the liquid-crystal panel to pass through a projection lens, so that images displayed on the liquid-crystal panel are projected in an enlarged manner. The projection-type liquid crystal display of the present invention is characterized by an arrangement wherein the thickness of the active-matrix substrate or the opposing substrate, or the thickness of the air layer, is designed so that the interface between the air layer and the active-matrix substrate, the opposing substrate, or the polarizing plate, is allowed to be located outside the depth of focus of the projection lens.

Since the interface between the active-matrix substrate, the opposing substrate, or the polarizing plate and the air layer is susceptible to scratches and the ingress of dust, the scratches and dust tend to be focused to form their images on the screen when the interface is located within the depth of focus of the projection lens. In contrast, with this arrangement wherein the thickness of the active-matrix substrate or the opposing substrate, or the thickness of the air layer, is designed so that the above-mentioned interface is allowed to be located outside the depth of focus of the projection lens, it becomes possible to prevent scratches and dust from being focused to form their images on the screen, thereby further improving the picture quality of images projected onto the screen.

In order to achieve the third objective, it is preferable to affix a transparent member having a non-polarizing property and having the anti-reflection film preliminarily formed thereon to the light-releasing surface of the active-matrix substrate, when the anti-reflection section is formed on the light-releasing surface of the active-matrix substrate whereon the semiconductor active device is formed.

For example, in the case of forming the anti-reflection film on the light-releasing surface of the active-matrix substrate prior to the formation of the semiconductor active device on the active-matrix substrate, the anti-reflection film tends to be susceptible to scratches during the formation of the semiconductor active device. When images are projected, these scratches tend to be focused to form their images on the screen, thereby causing degradation in picture quality. On the other hand, in the case of forming the anti-reflection film after the formation of the semiconductor active device, the semiconductor active device tends to be damaged or tends to be adversely affected by electrostatic destruction (ESD), thereby causing a reduction in the yield. Moreover, in the case of forming the anti-reflection film after completion of the liquid-crystal panel, the film quality of the anti-reflection film tends to deteriorate because of the restriction of the temperature to be applied to the liquid-crystal panel; this makes it impossible to form anti-reflection films having good characteristics.

By the use of the transparent member having a non-polarizing property and having the anti-reflection film preliminarily formed thereon, it becomes possible to solve all these problems and also to easily manufacture superior projection-type liquid crystal displays at high yield.

Furthermore, with an arrangement wherein the transparent member, having a non-polarizing property and having the anti-reflection film preliminarily formed thereon, is fixed to the active-matrix substrate with a liquid layer that has virtually the same refractive index as the active-matrix substrate sandwiched in between, it becomes possible to reduce damages due to stress onto the active-matrix substrate and also to suppress damages to the semiconductor active device and variations in the cell gap (the distance between substrates). Thus, it is possible to easily manufacture more superior projection-type liquid crystal displays at high yield.

For a fuller understanding of the nature and advantages of the invention, reference should be made to the ensuing detailed description taken in conjunction with the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE EMBODIMENTS

[EMBODIMENT 1]

Referring to FIGS. 1 through 6, the following description will discuss one embodiment of the present embodiment.

Figure 2:
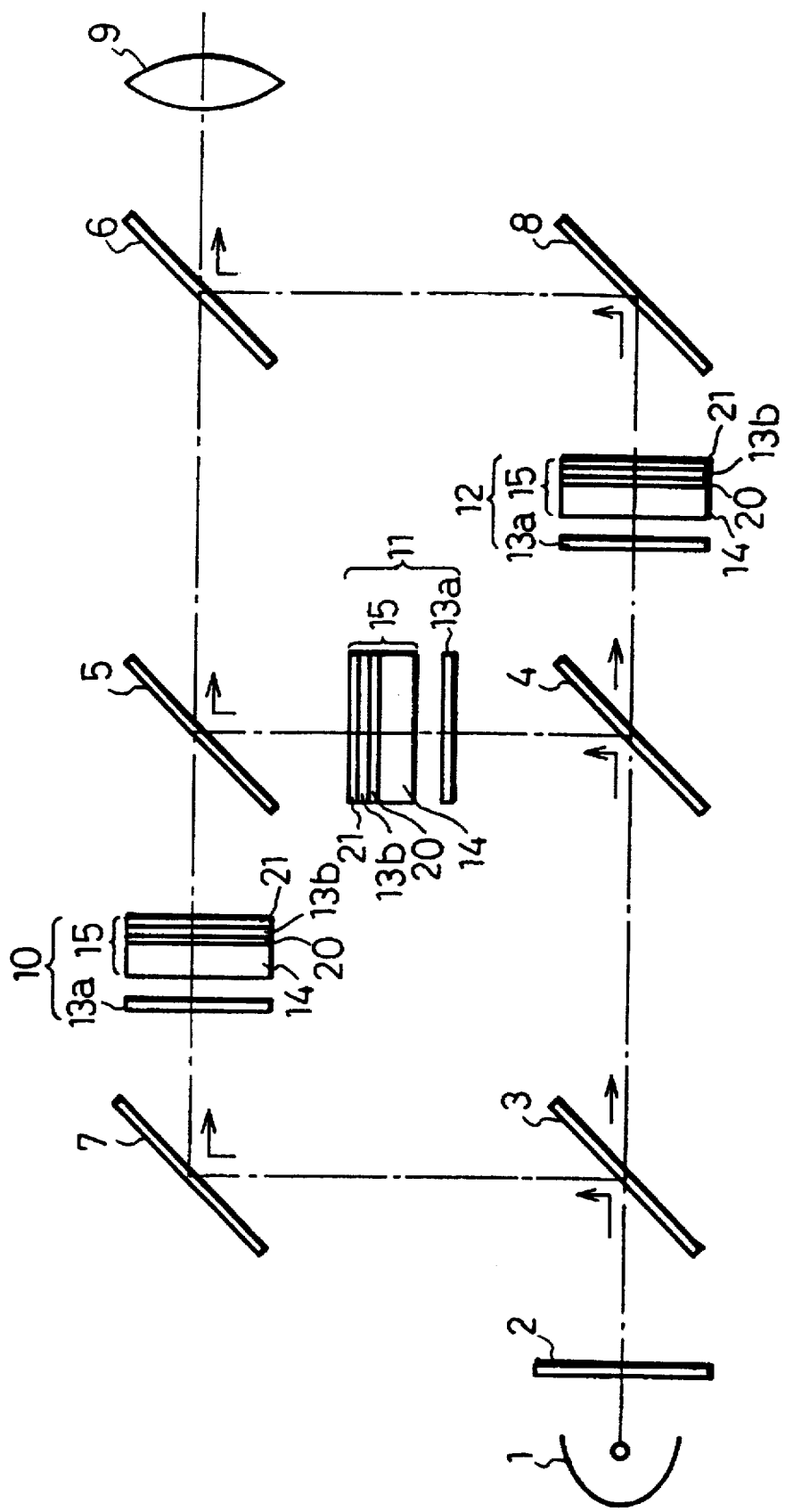
FIG. 2 is a schematic side view of the projection-type liquid crystal display.

As shown in FIG. 2, a projection-type liquid crystal display of the present embodiment is provided with a light source 1, a UV/IR cut filter 2, the first through fourth dichroic mirrors 3, 4, 5 and 6, the first and second reflection mirrors 7 and 8, and image-outputting sections 10, 11 and 12 that are respectively driven by signals corresponding to the primaries, that is, red, green and blue.

In the above-mentioned arrangement, a ray of light, illuminated from the light source 1 through the UV/IR cut filter 2, is first incident on the first dichroic mirror 3, and is separated into a reflected ray of light and a transmitted ray of light. The transmitted ray of light, transmitted through the first dichroic mirror 3, is incident on the second dichroic mirror 4, and is further separated into a reflected ray of light and a transmitted ray of light. In this manner, the rays of light, which have been separated into the primaries, that is, red, green and blue, by the first and second dichroic mirrors 3 and 4, are incident on the image-outputting sections 10, 11 and 12 corresponding to the respective colors. Here, the ray of light, which is to be incident on the image-outputting section 10, is incident thereon after having been reflected by the first reflection mirror 7.

Thereafter, the image light signals of the primaries, released from these image-outputting sections 10, 11 and 12, are synthesized through the third and fourth dichroic mirrors 5 and 6 as well as the second reflection mirror 8, and are incident on a projection lens 9 and displayed on a screen, not shown.

Next, an explanation will be given on the arrangements of the image-outputting sections 10, 11 and 12 in the projection-type liquid crystal display having the above-mentioned arrangement. Here, each of the image-outputting sections 10, 11 and 12 has almost the same arrangement except for each driving signal;. therefore, the explanation is given only on the arrangement of the image-outputting section 10, and the explanations of the image-outputting sections 11 and 12 are omitted.

The image-outputting section 10 is constituted of a liquid-crystal panel section 15 and a light-incident-side polarizing element 13a that is placed on the light-incident side thereof with an air layer located in between.

Figure 1:
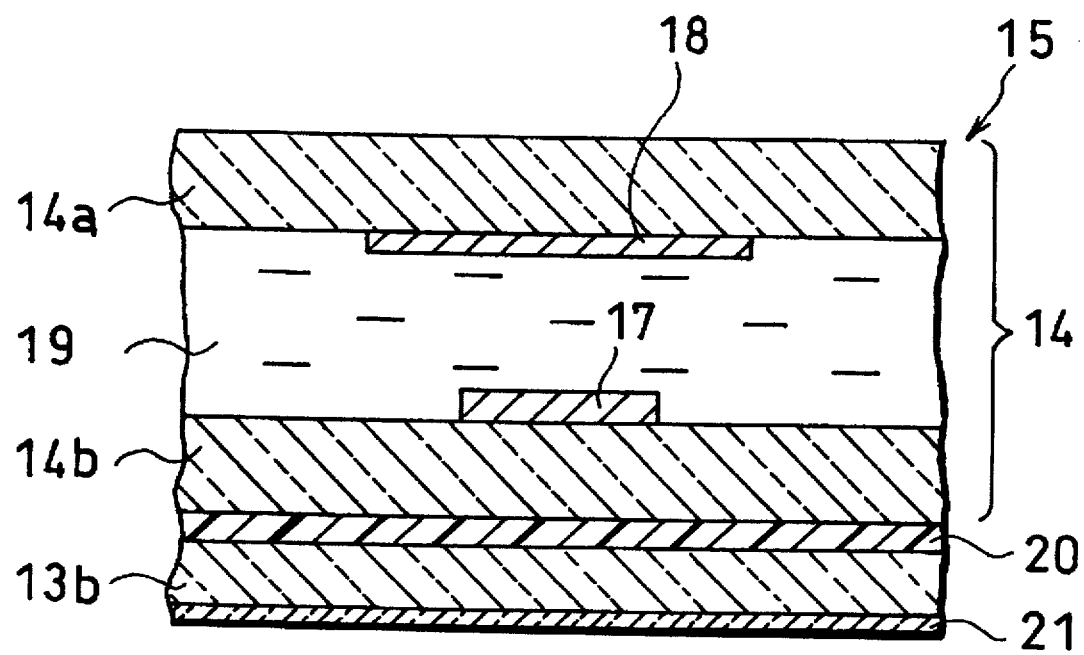
FIG. 1, which shows one embodiment of the present invention, is a cross-sectional view of an essential part of a liquid-crystal panel section in an image-outputting section that is installed in a projection-type liquid crystal display.

As shown in FIG. 1, the liquid-crystal panel section 15 is provided with a liquid crystal panel 14 that is constituted of an opposing substrate 14a and an active-matrix substrate 14b with a liquid crystal layer 19 sandwiched in between, both of which are designed in their thicknesses as will be described later.

The liquid crystal panel 14 is arranged so that the opposing substrate 14a is placed on the light-incident side and the active-matrix substrate 14b is placed on the light-releasing side, and a light-releasing-side polarizing element 13b is bonded to the light-releasing surface of the active-matrix substrate 14b in the liquid crystal panel 14 by the use of an adhesive material (or a bonding agent) 20 having virtually the same refractive index (approximately 1.5) as the active-matrix substrate 14b and the light-releasing-side polarizing element 13b. Further, on the light-releasing surface of the light-releasing-side polarizing element 13b that is exposed to the air layer, is formed a reflection-reducing coating layer 21 that functions as an anti-reflection section.

Additionally, the reflection-reducing coating layer 21 is preferably constituted of, for example, an inorganic thin film made of MgF or other materials, or a multi-layer film wherein a low-refractive-index thin-film (made of MgF or other materials) and a high-refractive-index thin-film (made of beryllium oxide, magnesium oxide, or other materials) are combinedly stacked.

Moreover, on the surface in the active-matrix substrate 14b of the liquid crystal panel 14 that faces the opposing substrate 14a, are formed semiconductor active devices 17, each of which corresponds to each display pixel. The gate electrode of each semiconductor active device 17, which will be described later, is connected to one of scanning lines and the source electrode thereof is connected to one of signal lines. Here, the scanning lines and the signal lines are arranged in the form of lattice by utilizing non-display regions that are located between the display pixels. Furthermore, on the opposite surface of the opposing substrate 14a is formed a light-shading pattern 18 for shading light from the semiconductor active device 17, the scanning lines and the signal lines, together with opposing electrodes, not shown.

Figure 32:
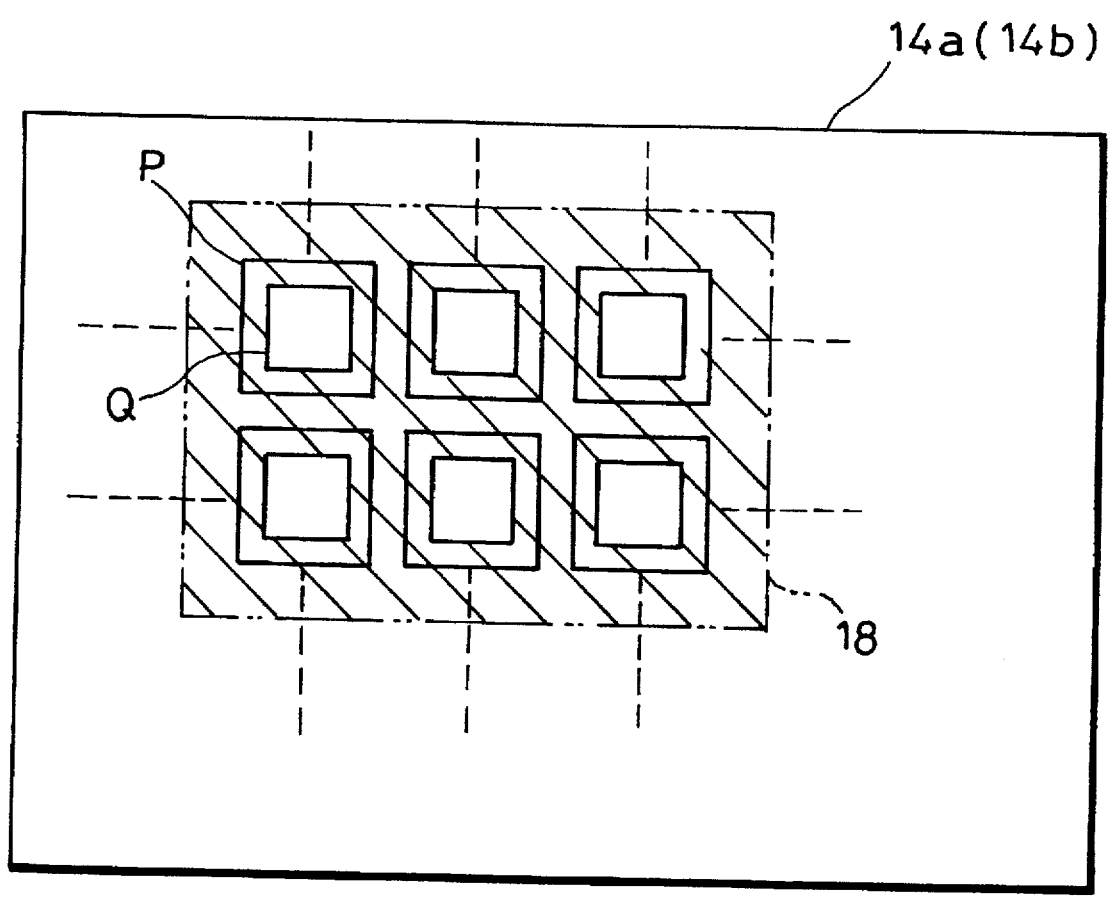
FIG. 32 is a schematic plan view that shows display pixel aperture sections in the liquid-crystal panel section of the present invention.

FIG. 32 is a schematic drawing that shows the display pixels and the light-shading pattern 18 that are viewed from the light-incident side or the light-releasing side. Each square P schematically shows a region corresponding to one display pixel including a region of formation of each semiconductor active device 17. On the other hand, each square Q schematically shows a light-transmitting region in each display pixel. Here, the area of each square Q, that is, the area of the light-transmitting region in each display pixel, is referred to as the area of the pixel aperture section.

Figure 5:
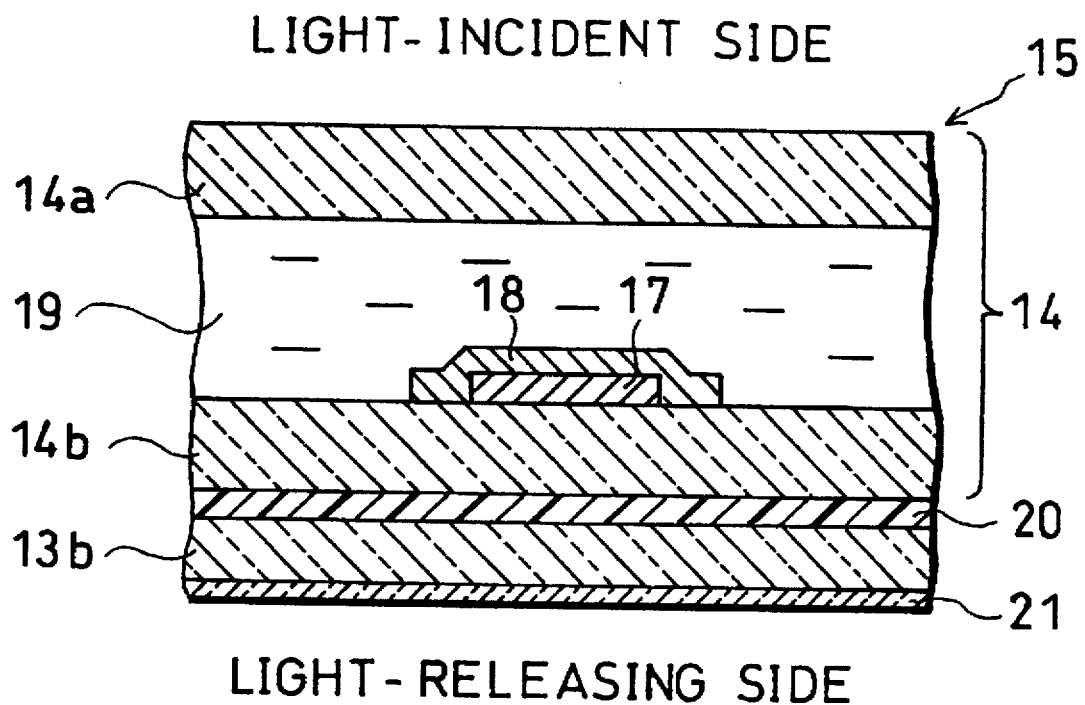
FIG. 5 is a cross-sectional view of an essential part of the liquid-crystal panel section that shows another installation of a light-shading pattern.

Additionally, the light-shading pattern 18 is not necessarily installed on the opposing substrate 14a side, and as shown in FIG. 5, it may be formed on the active-matrix substrate 14b side in such a manner as to cover the semiconductor active device 17.

Figure 3:
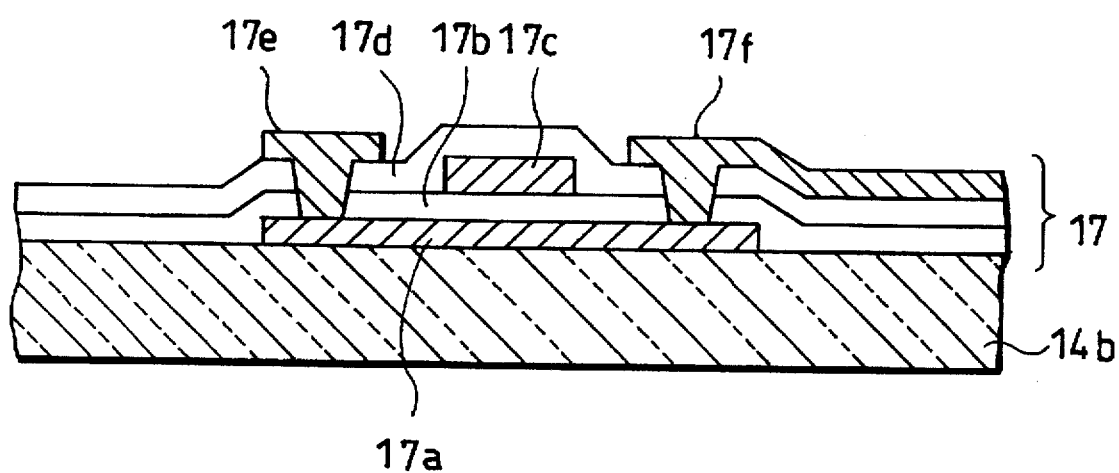
FIG. 3 is a cross-sectional view of an essential part of a semiconductor active device that is installed on an active matrix substrate of a liquid-crystal panel in the image-outputting section.

The semiconductor active device 17 is consisted of semiconductor active elements made of polycrystal silicon thin-film transistors having the top-gate construction. As shown in FIG. 3, the semiconductor active device 17 is designed so that a channel layer 17a, a gate insulating film 17b, a gate electrode 17c, and an inter-layer insulating film 17d are successively formed on the active-matrix substrate 14b with their shapes formed into respective predetermined patterns, and on the top of this construction are formed a source electrode 17e and a drain electrode 17f.

In the image-outputting section 10 having the above-mentioned arrangement, measurements were made concerning the following factors: internal reflection on the light-releasing surface of the active-matrix substrate 14b (the interface between the active-matrix substrate 14b and the adhesive material 20) of the liquid crystal panel 14; external reflection on the light-incident surface of the light-releasing-side polarizing element 13b (the interface between the adhesive material 20 and the light-releasing-side polarizing element 13b); and internal reflection on the light-releasing surface of the light-releasing-side polarizing element 13b (the interface between the light-releasing-side polarizing element 13b and the reflection-reducing coating layer 21). The measured values were compared with those in the case of using a conventional image-outputting section 52 shown in FIG. 26, and the results of comparison are described as follows.

Here, as for light that proceeds from the first medium toward the second medium, when the first and second media that have respectively different refractive indexes are located in contact with each other, reflections, which are exerted on the interface of the two media, are defined as an internal reflection for the first medium and as an external reflection for the second medium.

In general, as for the reflection of incident light, the reflection, represented by the following equation, occurs on the interface of substances that have respectively different refractive indexes.

Reflectance: $R=[(n1-n2)^2/(n1+n2)^2] \times 100 [\%]$ n1 and n2: refractive indexes of substances In the case of the conventional image-outputting section 52 wherein the air layer is located between the active-matrix substrate 54b and the light-releasing-side polarizing element 55b, internal reflection in the order of 4% is exerted on the light-releasing surface of the active-matrix substrate 54b due to the difference between the active-matrix substrate 54b (refractive index: approximately 1.5) and the air layer (refractive index: approximately 1.0), and external reflection in the order of 3% is exerted on the light-incident surface of the light-releasing-side polarizing element 55b due to the difference between the air layer and the light-releasing-side polarizing element 55b (refractive index: approximately 1.5).

In contrast, in the case of the image-outputting section 10 of the present invention, the light-releasing-side polarizing element 13b is bonded to the light-releasing surface of the active-matrix substrate 14b by using the adhesive material 20 that has virtually the same refractive index as the active-matrix substrate 14b and the light-releasing-side polarizing element 13b; therefore, internal reflection is hardly exerted on the light-releasing surface of the active-matrix substrate 14b, and the reflection is virtually 0%. Further, external reflection is hardly exerted on the light-incident surface of the light-releasing-side polarizing element 13b, and the reflection is virtually 0%.

Moreover, internal reflection on the light-releasing surface of the light-releasing-side polarizing element 13b becomes virtually 0% because of the reflection-reducing coating layer 21 that is provided on the light-releasing surface of the light-releasing-side polarizing element 13b.

As described above, it is possible to positively reduce internal reflection on the light-releasing surface of the active-matrix substrate 14b, external reflection on light-incident surface of the light-releasing-side polarizing element 13b, and internal reflection on the light-releasing surface of the light-releasing-side polarizing element 13b.

Next, an explanation will be given on a setting method for the thicknesses of the opposing substrate 14a and the active-matrix substrate 14b in the liquid crystal panel 14.

When defects, such as dust and scratches on the light-incident surface of the opposing substrate 14a and scratches and flaws in the light-releasing-side polarizing element 13b in the liquid crystal panel 14, are located within the depth of focus of the projection lens 9, these defects tend to be focused to form their images on a screen or other places by the projection lens 9, thereby causing irregularities in colors and luminance. Thus, the picture quality tends to be lowered. In order to solve this problem, substrates, which have thicknesses that allow the light-releasing surface of the active-matrix substrate 14b and the light-incident surface of the opposing substrate 14a to be located outside the depth of focus of the projection lens 9, are used as the active-matrix substrate 14b and the opposing substrate 14a. Here, it is possible to ensure that the light-releasing-side polarizing element 13b, which is located at a position closer to the projection lens 9 than the active-matrix substrate 14b, be always placed outside the depth of focus by placing the light-releasing surface of the active-matrix substrate 14b outside the depth of focus of the projection lens 9.

With this arrangement, the projection-type liquid crystal display of the present embodiment makes it possible to prevent defects, such as dust and scratches on the light-incident surface of the opposing substrate 14a and scratches and flaws in the light-releasing-side polarizing element 13b, from being focused to form their images on a screen or other places. Thus, it becomes possible to further improve the picture quality.

Here, a further explanation will be given on the setting of the thicknesses of the substrates by giving more specific values. There are correlations with each other among the following factors: the sizes of dust and scratches that are located on the light-incident surface of the opposing substrate and the light-releasing surface of the active-matrix substrate in the liquid crystal panel and that causes the above-mentioned problem by being focused to form their images on a screen or other places by projection lens upon projecting images through the liquid crystal panel (in the present embodiment, there is no possibility of dust and scratches since the light-releasing-side polarizing element 13b is bonded thereto); the sizes of scratches, flaws, etc. in the light-releasing-side polarizing element; and the aforementioned area of the pixel aperture section of the liquid crystal panel.

Figure 4:
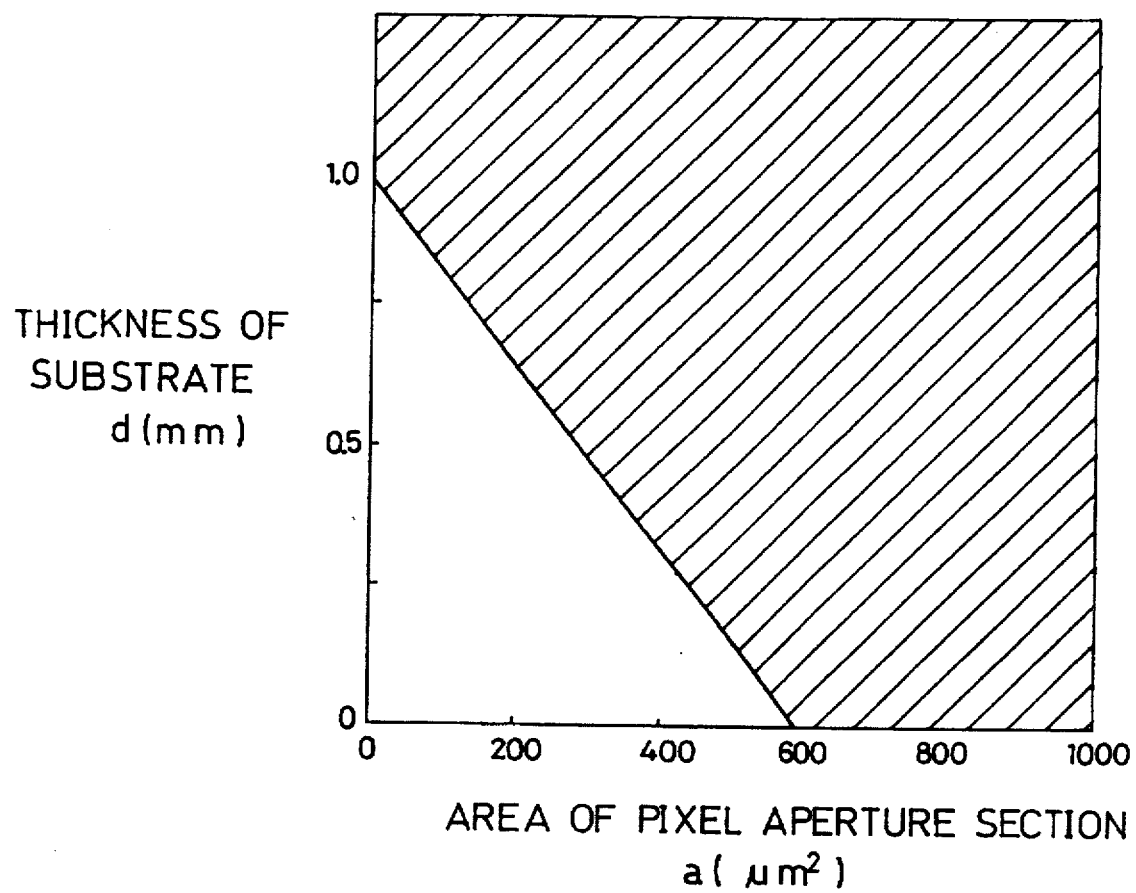
FIG. 4 is a graph indicating the relationship between the thickness of a substrate and the area of a pixel aperture section.

Based on experiments, it has been found that by using substrates whose thicknesses are located within a range indicated by a shaded portion in FIG. 4 as the opposing substrate 14a and the active-matrix substrate 14b, it is possible to prevent defects, such as dust and scratches on the light-incident surface of the opposing substrate 14a and scratches and flaws in the light-releasing-side polarizing element 13b, from being focused to form their images on a screen or other places by the projection lens 9. The range, indicated by the shaded portion in FIG. 4, is represented by the following inequality:

$$d > -0.0016a + 1.26$$

d: thickness of substrate (unit: mm)
a: area of pixel aperture section of liquid crystal panel (unit: $\mu m^2$)

As described above, in the image-outputting sections 10, 11 and 12 that are installed in the projection-type liquid crystal display of the present embodiment, the active-matrix substrate 14b and the light-releasing-side polarizing element 13b of the liquid crystal panel 14 are bonded to each other by using the adhesive material 20 that has virtually the same refractive index as the active-matrix substrate 14b and the light-releasing-side polarizing element 13b. Further, the reflection-reducing coating layer 21 is provided on the light-releasing surface of the light-releasing-side polarizing element 13b.

Therefore, it is possible to respectively reduce the internal reflection on the light-releasing surface of the active-matrix substrate 14b, the external reflection on the light-incident surface of the light-releasing-side polarizing element 13b and the internal reflection on the light-releasing surface of the light-releasing-side polarizing element 13b. This arrangement positively reduces the possibility of a reduction in the OFF characteristics of the semiconductor active device 17 that is installed on the active-matrix substrate 14b in the liquid crystal panel 14, as well as suppressing crosstalk and the degradation of contrast. Thus, it becomes possible to obtain good images with high picture quality, even when compact, high accuracy liquid crystal panels having minute pixel electrodes are used.

In the case when the semiconductor active device 17, formed on the active-matrix substrate 14b, is constituted of, especially, the semiconductor active elements of polycrystal silicon thin-film transistors of the top-gate construction as in the liquid crystal panel 14 of the present embodiment, the channel layer 17a is not shielded from light by the gate electrode 17c, when viewed from the back side of the active-matrix substrate 14b. This causes a problem in which the apparatus tends to be subject to a reduction in the OFF characteristics of the semiconductor active device 17 due to the internal reflection on the light-releasing-surface of the active-matrix substrate 14b, the external reflection on the light-incident surface of the light-releasing-side polarizing element 13b and the internal reflection on the light-releasing surface of the light-releasing-side polarizing element 13b, compared to the arrangement in which the semiconductor active device 17 is made of semiconductor active elements of polycrystal silicon thin-film transistors of the bottom-gate construction. However, with the arrangement shown in FIG. 1, it becomes possible to obtain good images with high picture quality, even when the semiconductor active elements of polycrystal silicon thin-film transistors of the top-gate construction are adopted in a projection-type liquid crystal display.

Moreover, in the projection-type liquid crystal display of the present embodiment, since substrates whose thicknesses are located within the range indicated by shaded portion in FIG. 4 as the opposing substrate 14a and the active-matrix substrate 14b, it is possible to prevent defects, such as dust and scratches on the light-incident surface of the opposing substrate 14a and scratches and flaws in the light-releasing-side polarizing element 13b, from being focused to form their images on a screen or other places by the projection lens 9. Thus, it becomes possible to obtain better images with high picture quality. In this case, the thicknesses of the substrates are preliminarily determined before the manufacturing process of the liquid crystal panel 14; therefore, this arrangement provides advantages such as a reduction in manufacturing processes and low manufacturing costs, compared with the arrangement disclosed by Japanese Laid-Open Patent Publication 195381/1990 (Tokukaihei 2-195381) wherein glass blocks or other materials, which have been prepared in a separated manner, are affixed to the substrates afterward in order to allow the light-releasing-side surface and the light-incident-side surface in the liquid crystal panel to be located outside the depth of focus of the projection lens.

Additionally, dust adhering to the light-incident surface of the opposing substrate 14a can be easily removed therefrom by a cleaning operation; therefore, it is not necessarily required to design both the thicknesses of the active-matrix substrate 14a and the opposing substrate 14b to be located within the range indicated by shaded portion in FIG. 4. In other words, only the thickness of the active-matrix substrate 14b may be designed to be located within the range indicated by shaded portion in FIG. 4 so that at least defects such as scratches and flaws in the light-releasing-side polarizing element 13b, which are not removed by a cleaning operation, may not form their images. Even this arrangement makes it possible to improve the quality of images sufficiently, compared to the conventional arrangement.

Figure 6:
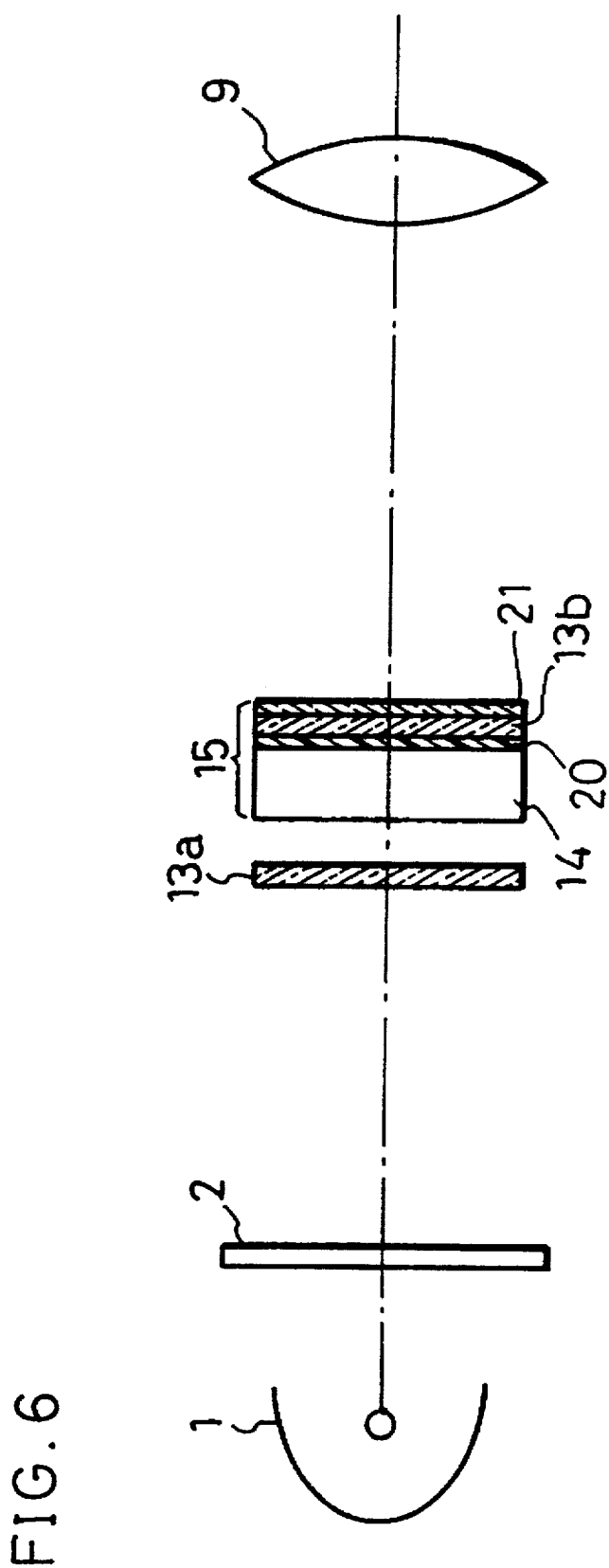
FIG. 6 is a schematic side view of a projection-type liquid crystal display of another embodiment of the present invention.

Furthermore, in the present embodiment, the projection-type liquid crystal display, which separates light from the light source into the primaries and directs them to the three image-outputting sections 10, 11 and 12, is adopted. However, the present invention is not intended to be limited to this arrangement, and the image-outputting sections having the above-mentioned arrangement may be also adopted in a projection-type liquid crystal display, for example, as shown in FIG. 6, which has only one image-outputting section.

[EMBODIMENT 2]

Referring to FIGS. 7 through 10, the following description will discuss another embodiment of the present invention. Here, for convenience of explanation, those members that have the same functions and that are described in the aforementioned embodiment are indicated by the same reference numerals and the description thereof is omitted.

Figure 7:
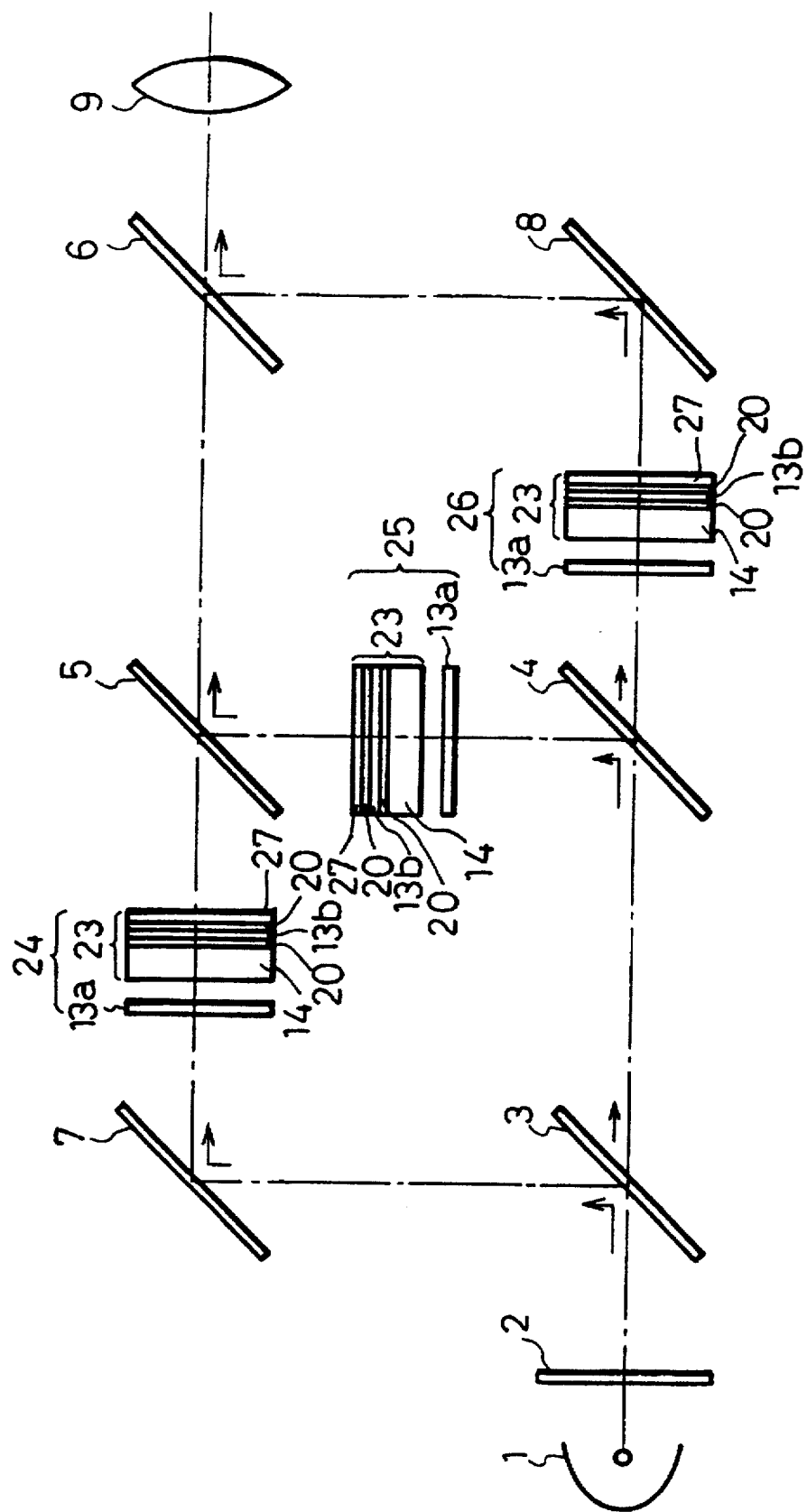
FIG. 7 is a schematic side view of a projection-type liquid crystal display of still another embodiment of the present invention.

As shown in FIG. 7, in a projection-type liquid crystal display of the present embodiment, image-outputting sections 24, 25 and 26 are installed in place of the image-outputting sections 10, 11 and 12 of the projection-type liquid crystal display of the aforementioned embodiment 1.

Here, in the image-outputting sections 24, 25 and 26 also, since they have virtually the same arrangement except for their driving signals in the same manner as the aforementioned embodiment 1, an explanation will be given only on the image-outputting section 24.

The image-outputting section 24 is provided with a liquid crystal panel section 23 in place of the liquid crystal panel section 15 in the image-outputting section 10 in the aforementioned embodiment 1.

Figure 8:
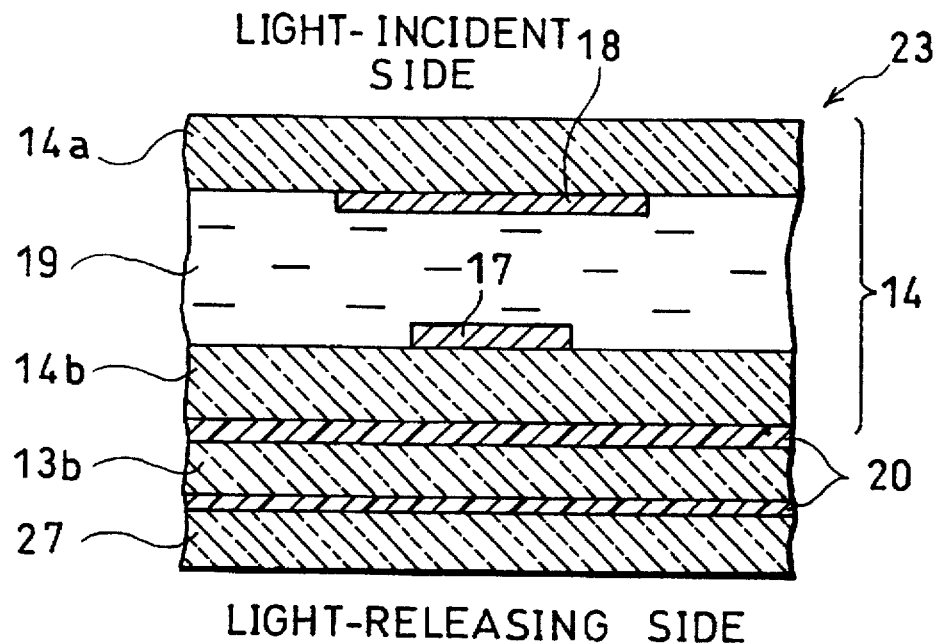
FIG. 8 is a cross-sectional view of an essential part of a liquid-crystal panel section in an image-outputting section that is installed in the projection-type liquid crystal display of FIG. 5.

As shown in FIG. 8, in the liquid crystal panel section 23, a half-wave plate 27 is bonded to the light-releasing surface of the light-releasing-side polarizing element 13b by using an adhesive material 20, which is different from the liquid crystal panel section 15 in which the reflection-reducing coating layer 21 is laid thereon as the anti-reflection section.

With the image-outputting section 24 wherein such a liquid crystal panel section 23 is provided, it becomes possible to positively reduce the internal reflection on the light-releasing surface of the light-releasing-side polarizing element 13b in the same manner as the aforementioned embodiment 1. As a result, the same effects as those of the aforementioned embodiment 1 can be obtained.

Figure 9:
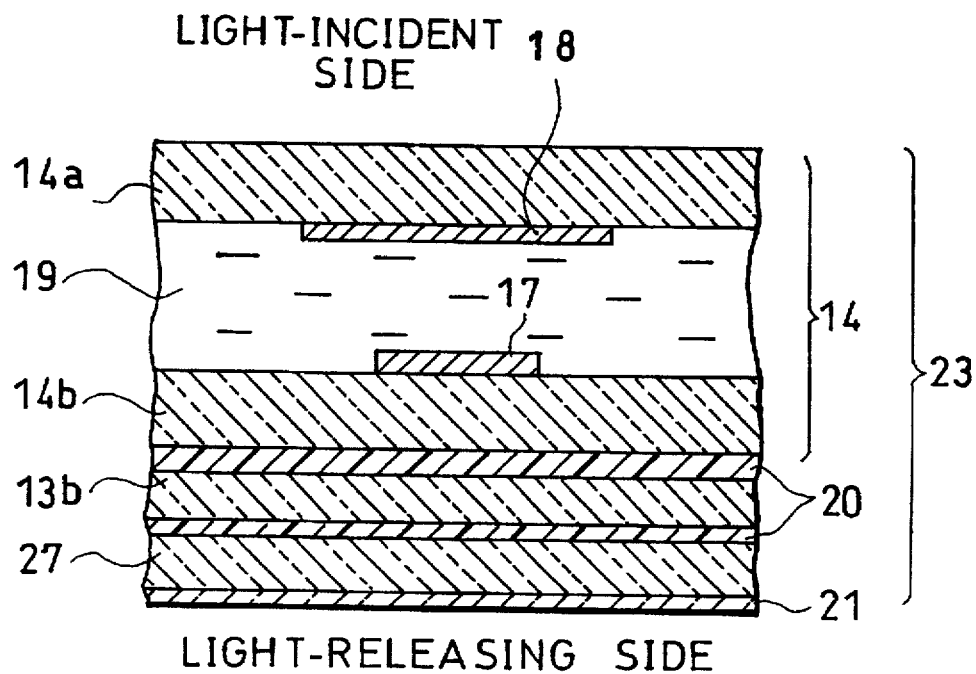
FIG. 9 is a cross-sectional view of an essential part that shows another construction of the liquid-crystal panel section of FIG. 6.

Moreover, as shown in FIG. 9, a reflection-reducing coating layer 21 is laid on the light-releasing surface of the half-wave plate 27 that is exposed to an air layer; this makes it possible to reduce the internal reflection on the light-releasing surface of the half-wave plate 27 (the interface between the half-wave plate 27 and the air layer).

Additionally, in this case, instead of applying the reflection-reducing coating layer 21 directly onto the half-wave plate 27, a transparent plate made of a transparent non-polarizing material, on which the reflection-reducing coating layer 21 is laid, may be bonded to the half-wave plate 27. With this arrangement wherein the reflection-reducing coating layer 21 is laid on the light-releasing surface of the half-wave plate 27, it becomes possible to further suppress crosstalk and a reduction in contrast due to the reflection, thereby making it possible to obtain better images with high picture quality. As for materials of the transparent plate or a transparent layer made of a non-polarizing material, any of the following materials or combinations thereof may be used: glass substrate, quartz substrate, film of acetate-cellulose group, film of polyester group, polycarbonate film, and polysulfone film.

Figure 10:
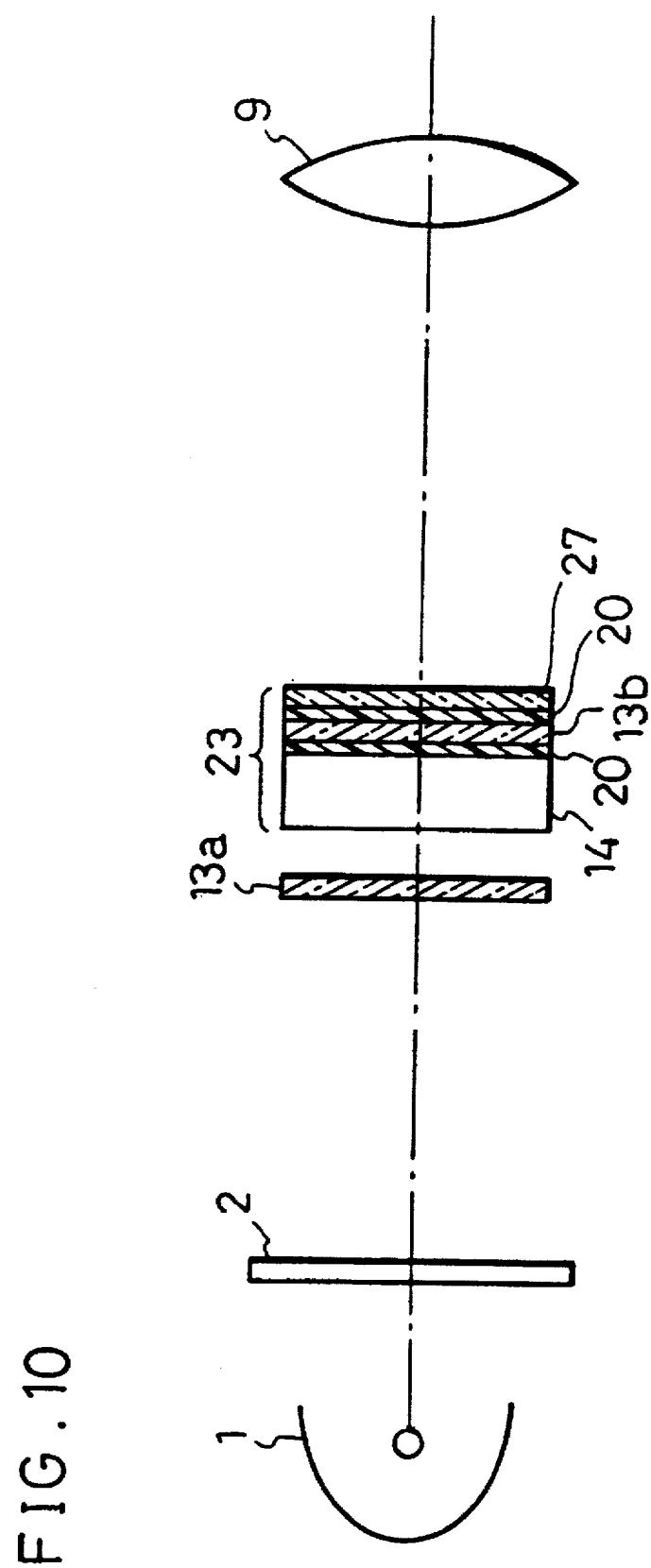
FIG. 10 is a schematic side view of a projection-type liquid crystal display of still another embodiment of the present invention.

In the present embodiment also, the projection-type liquid crystal display, which separates light from the light source into the primaries and directs them to the three image-outputting sections 24, 25 and 26, is adopted. However, the present invention is not intended to be limited to this arrangement, and the image-outputting sections having the above-mentioned arrangement may be also adopted in a projection-type liquid crystal display, for example, as shown in FIG. 10.

[EMBODIMENT 3]

Figure 11:
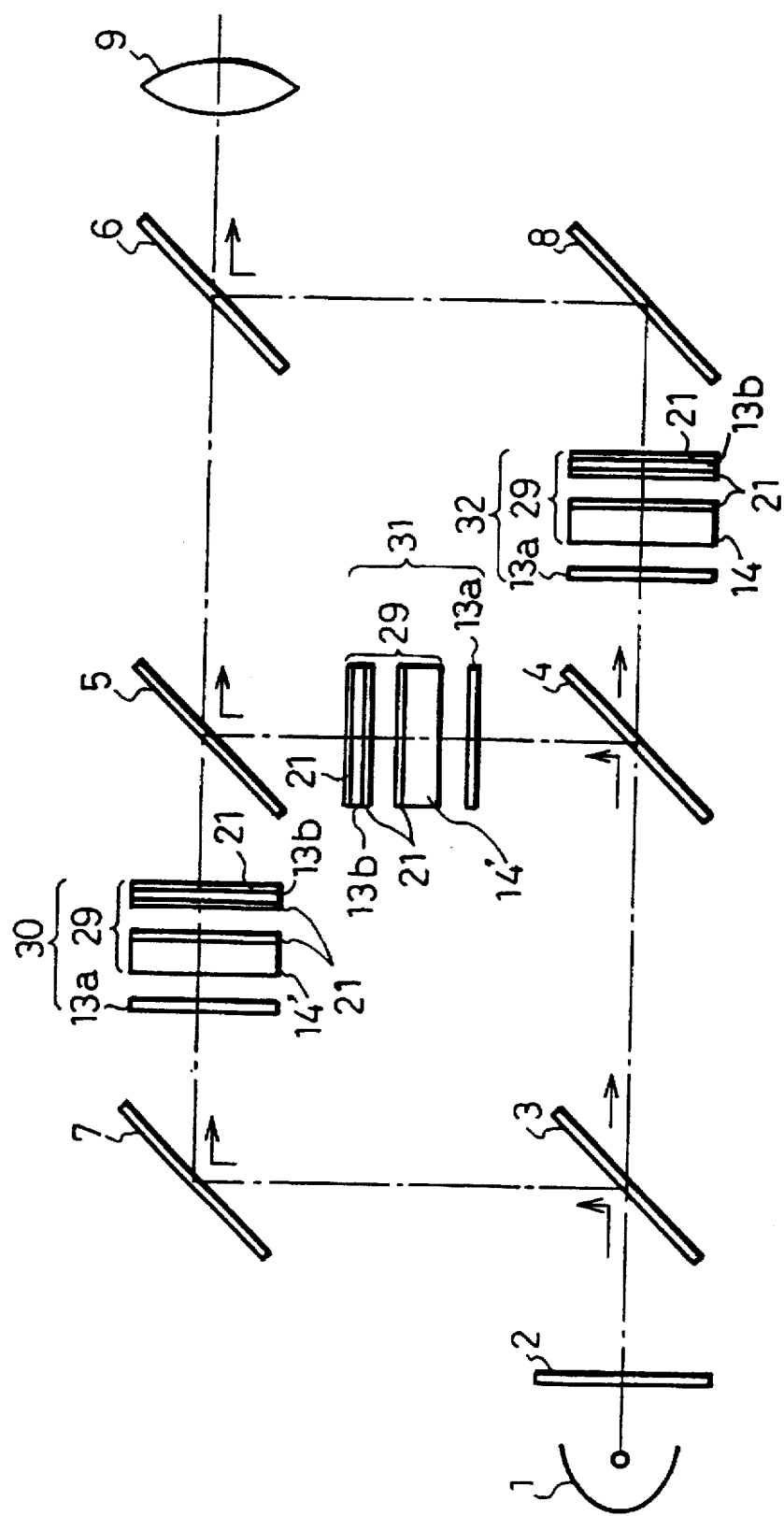
FIG. 11 is a schematic side view of a projection-type liquid crystal display of still another embodiment of the present invention.
Figure 12:
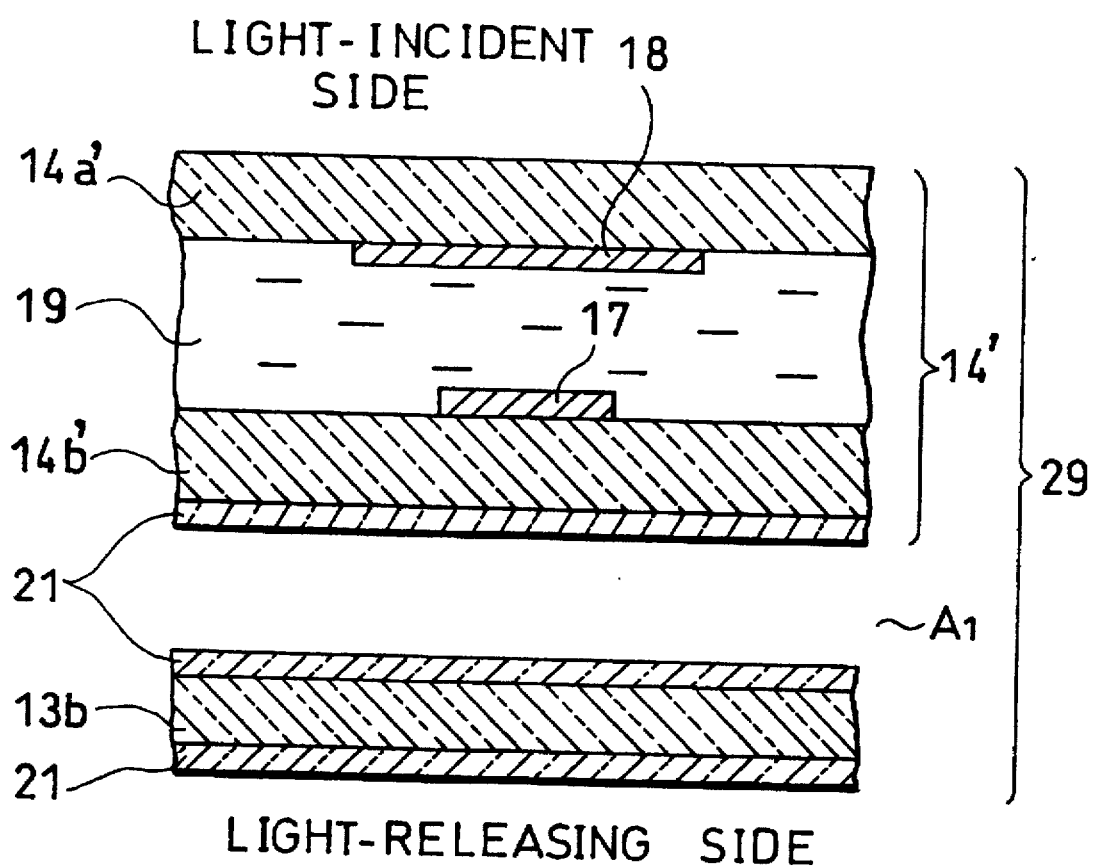
FIG. 12 is a cross-sectional view of an essential part of a liquid-crystal panel section in an image-outputting section that is installed in the projection-type liquid crystal display of FIG. 11.
Figure 13:
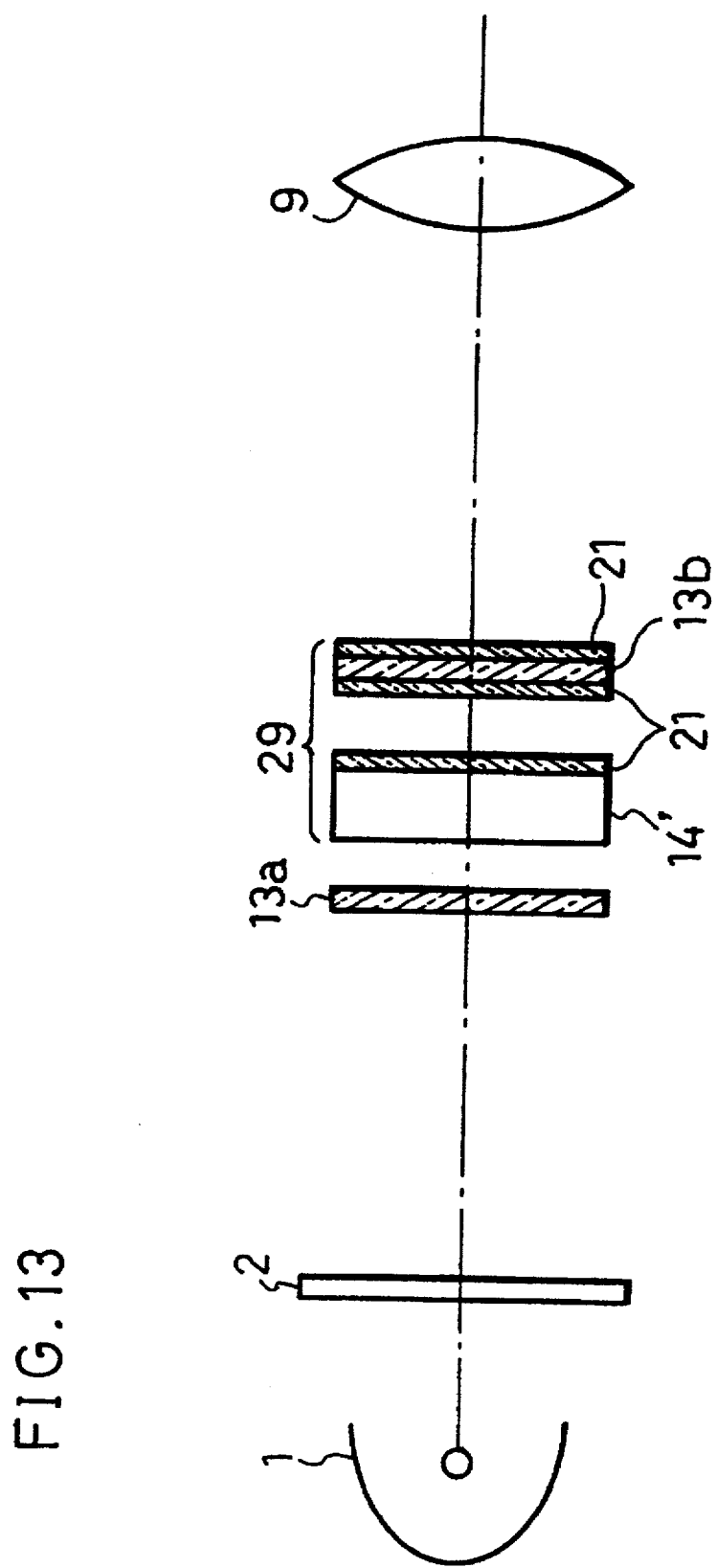
FIG. 13 is a schematic side view of a projection-type liquid crystal display of still another embodiment of the present invention.

Referring to FIGS. 11 through 13, the following description will discuss another embodiment of the present invention. Here, for convenience of explanation, those members that have the same functions and that are described in the aforementioned embodiment are indicated by the same reference numerals and the description thereof is omitted.

In the arrangements of the projection-type liquid crystal displays shown in the aforementioned embodiments 1 and 2, it is necessary to allow at least the thickness of the active-matrix substrate 14b to be located within the range indicated by shaded portion in FIG. 4, in order to prevent defects, such as scratches and flaws, in the light-releasing-side polarizing element 13b, which can not be removed by a cleaning process, from being focused to form their images on the screen by the projection lens 9 and from causing adverse effects on the picture quality. However, when the range of thickness is determined in this manner, commonly produced liquid crystal panels can not be used; this causes high manufacturing costs.

In order to solve the above-mentioned problem, the present embodiment proposes an arrangement which is capable of preventing defects, such as scratches and flaws, in the light-releasing-side polarizing element from being focused to form their images on the screen, without the necessity of locating the thickness of the active-matrix substrate within the range indicated by the shaded portion in FIG. 4. This arrangement makes the semiconductor active elements installed on the active-matrix substrate in the liquid crystal panel free from a reduction in the OFF characteristics, suppresses crosstalk and a reduction in contrast, and thus provides good images with high picture quality.

As shown in FIG. 11, in a projection-type liquid crystal display of the present embodiment, image-outputting sections 30, 31 and 32 are installed in place of the image-outputting sections 10, 11 and 12 of the projection-type liquid crystal display of the aforementioned embodiment 1.

Here, in the image-outputting sections 30, 31 and 32 also, since they have virtually the same arrangement except for their driving signals in the same manner as the aforementioned embodiment 1, an explanation will be given only on the image-outputting section 30.

The image-outputting section 30 is provided with a liquid crystal panel section 29 in place of the liquid crystal panel section 15 in the image-outputting section 10 in the aforementioned embodiment 1.

As shown in FIG. 12, the liquid crystal panel section 29 is provided with a liquid crystal panel 14'. In the liquid crystal panel 14', the thicknesses of an active-matrix substrate 14b' and an opposing substrate 14a' are respectively located outside the range indicated by the shaded portion in FIG. 4. The liquid crystal panel 14' and the light-releasing-side polarizing element 13b are placed apart from each other with an air layer $A_1$ located in between, and reflection-reducing coating layers 21 are laid on the light-releasing surface of the active-matrix substrate 14b' and both the light-incident and light-releasing surfaces of the light-releasing-side polarizing element 13b respectively. Here, the thickness of the air layer $A_1$ is arranged so that the light-releasing-side polarizing element 13b is separated from the drain electrode 17f (see FIG. 3) that is one of the display pixel electrodes of the liquid crystal panel 14' beyond the depth of focus of the projection lens 9.

In the image-outputting section 30 having such a liquid crystal panel section 29, the internal reflection on the light-releasing surface (the interface between the active-matrix substrate 14b' and the air layer $A_1$) of the active-matrix substrate 14b' in the liquid crystal panel 14' is reduced to virtually 0% from the order of 4% that is obtained in the conventional image-outputting section 52 (see FIG. 26) by the use of the reflection-reducing coating layer 21 laid on the active-matrix substrate 14b'.

Further, the external reflection on the light-incident surface (the interface between the air layer $A_1$ and the light-releasing-side polarizing element 13b) of the light-releasing-side polarizing element 13b is reduced to virtually 0% from the order of 3% that is obtained in the conventional image-outputting section 52 (see FIG. 26) by the use of the reflection-reducing coating layer 21 laid on the light-incident surface of the light-releasing-side polarizing element 13b.

Similarly, the internal reflection on the light-releasing surface (the interface between the light-releasing-side polarizing element 13b and the air layer) is restricted to virtually 0% by the use of the reflection-reducing coating layer 21 laid on the light-releasing surface of the light-releasing-side polarizing element 13b.

Therefore, in this arrangement also, it becomes possible to make the semiconductor active device 17 formed on the active-matrix substrate 14b' free from a reduction in the OFF characteristics, and also to suppress crosstalk and a reduction in contrast. Thus, it is possible to obtain the same effect as that of the aforementioned embodiments 1 and 2, that is, the effect wherein even when compact, high accuracy liquid crystal panels with minute display pixel electrodes are used, good images with high picture quality are obtainable.

Further, in the above-mentioned image-outputting section 30, the display pixel electrodes of the liquid crystal panel 14' and the light-releasing-side polarizing element 13b are separated from each other beyond the depth of focus of the projection lens 9 by the air layer $A_1$; this makes it possible to prevent defects, such as scratches and flaws, in the light-releasing-side polarizing element 13b from being focused to form images on the screen by the projection lens 9.

Figure 14:
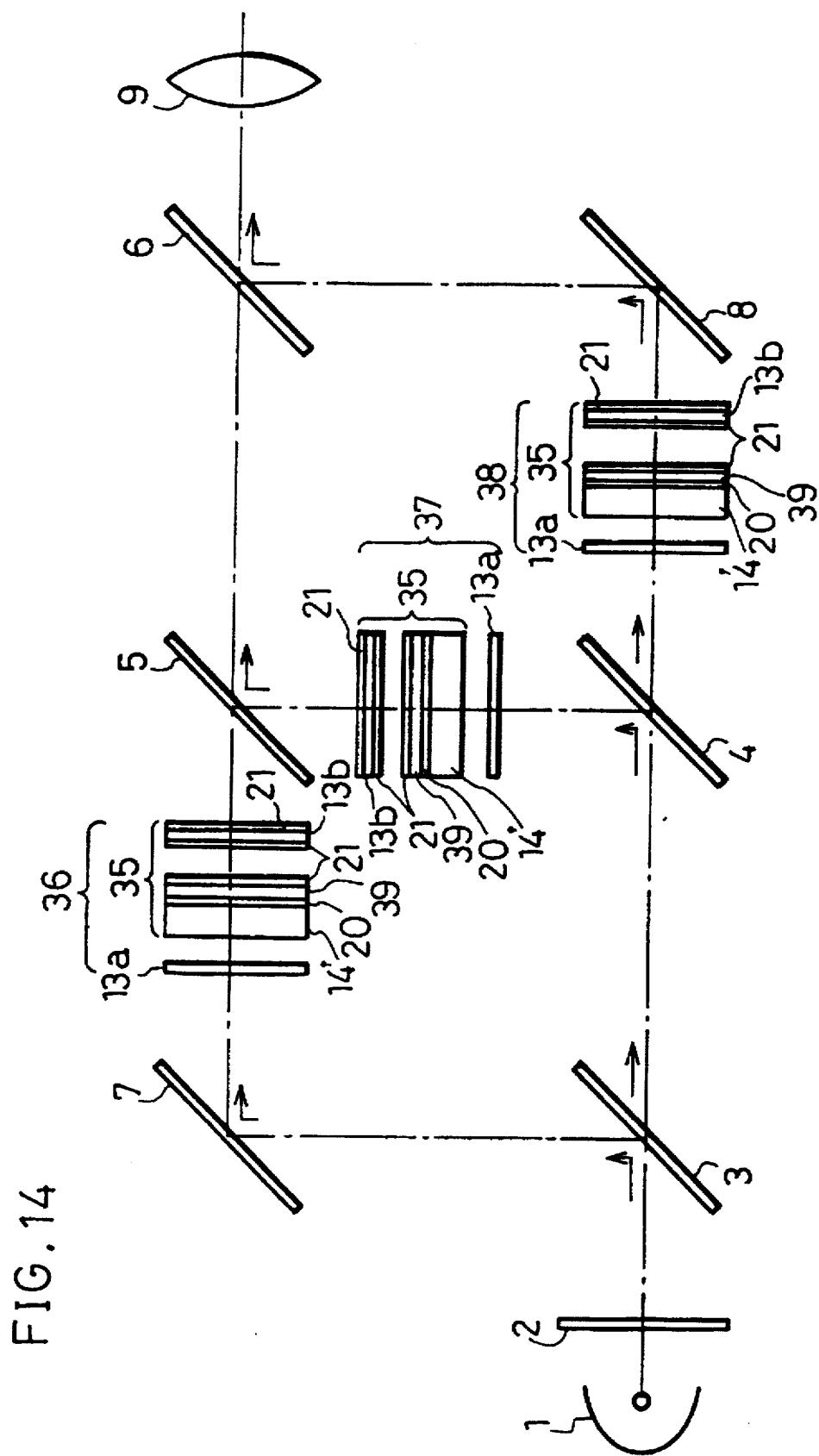
FIG. 14 is a schematic side view of a projection-type liquid crystal display of still another embodiment of the present invention.

Additionally, in the case when the liquid crystal panel section 29 is constituted of the liquid crystal panel 14 wherein the thicknesses of the active-matrix substrate 14b and the opposing substrate 14a are located within the range indicated by the shaded portion in FIG. 14 as shown in the aforementioned embodiments 1 and 2, it is possible to prevent dust and scratches, staying on the light-incident surface of the opposing substrate 14a and the light-releasing surface of the active-matrix substrate 14b, from being focused to form their images without the necessity of cleaning these surfaces.

In the present embodiment also, the projection-type liquid crystal display, which separates light from the light source into the primaries and directs them to the three image-outputting sections 30, 31 and 32, is adopted. However, the present invention is not intended to be limited to this arrangement, and the image-outputting sections having the above-mentioned arrangement may be also adopted in a projection-type liquid crystal display having only one image-outputting section, for example, as shown in FIG. 13.

[EMBODIMENT 4]

Figure 15:
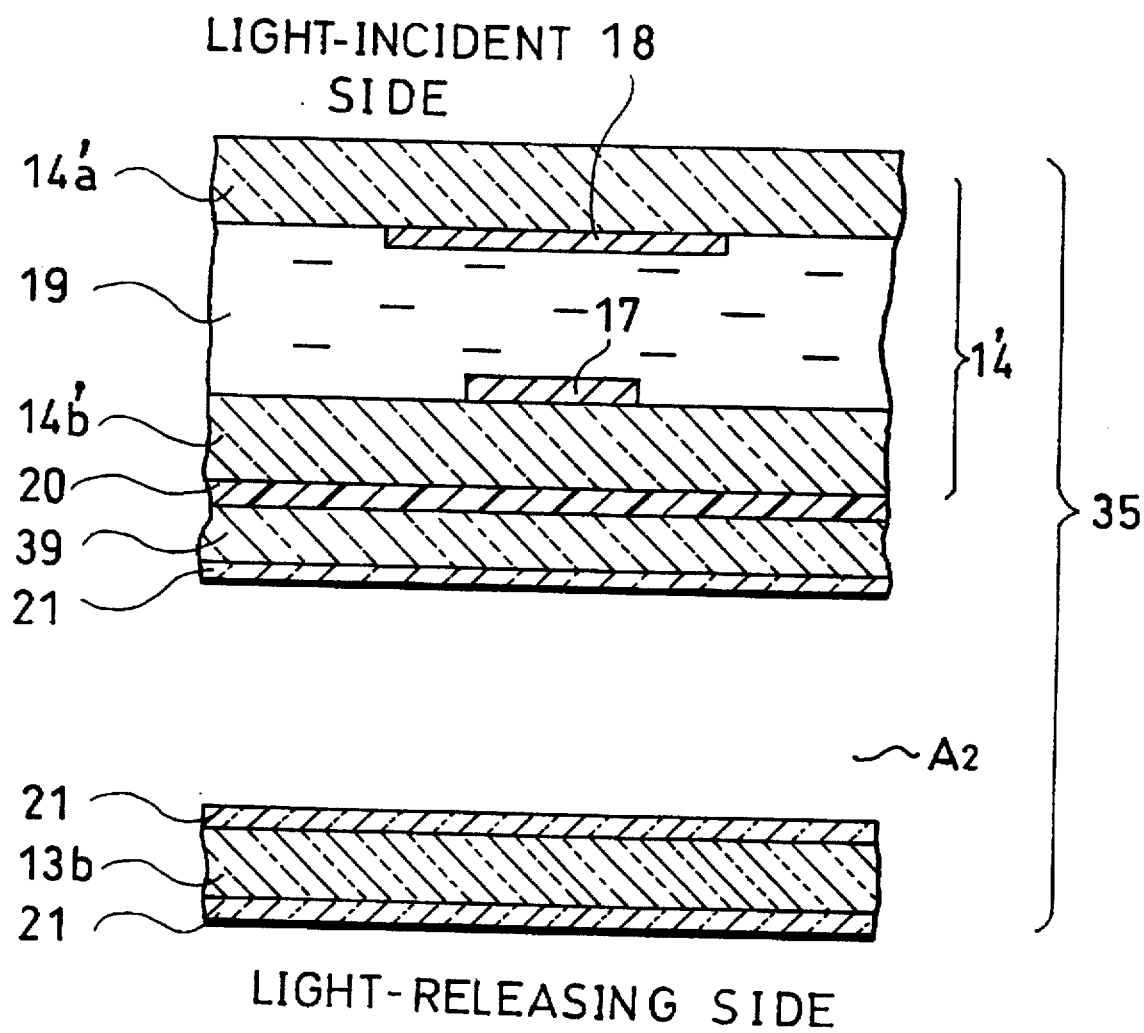
FIG. 15 is a cross-sectional view of an essential part of a liquid-crystal panel section in an image-outputting section that is installed in the projection-type liquid crystal display of FIG. 14.
Figure 16:
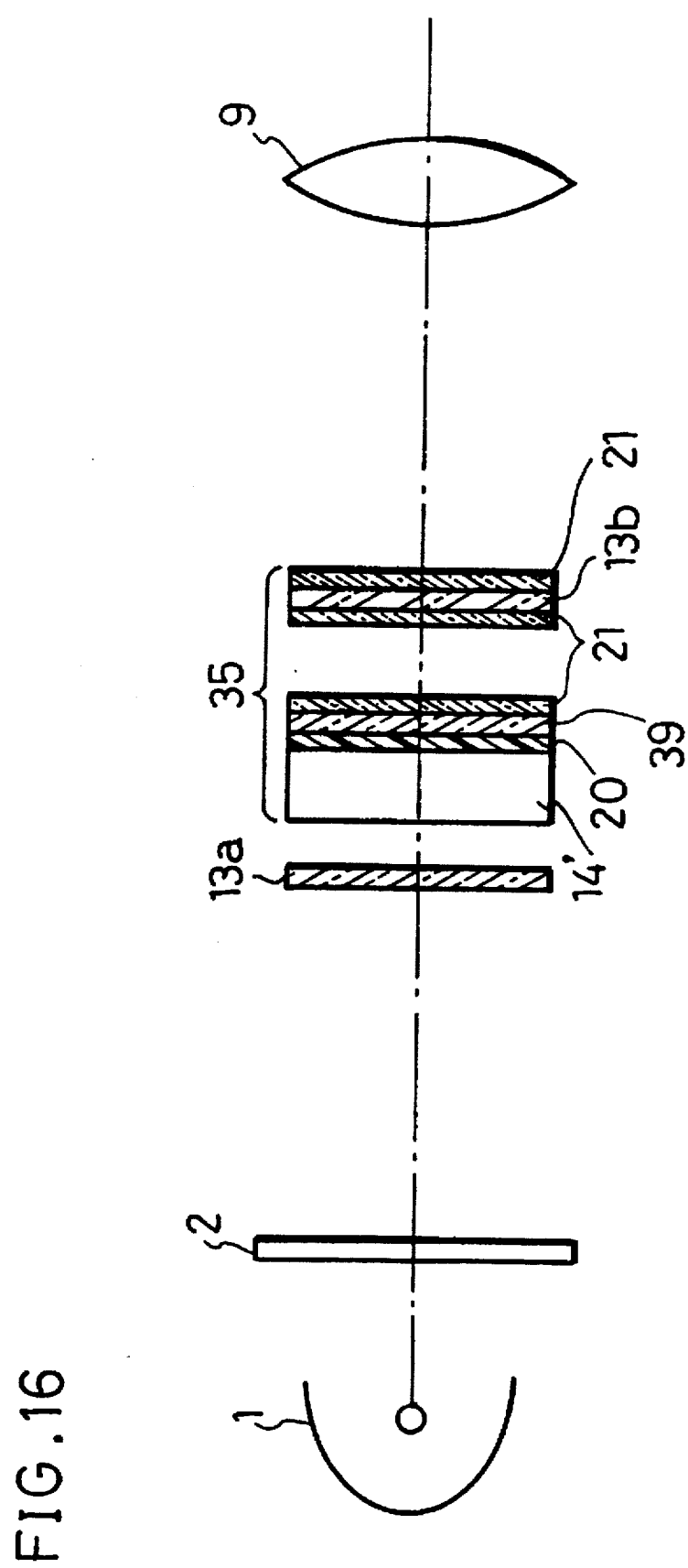
FIG. 16 is a schematic side view of a projection-type liquid crystal display of still another embodiment of the present invention.

Referring to FIGS. 14 through 16, the following description will discuss another embodiment of the present invention. Here, for convenience of explanation, those members that have the same functions and that are described in the aforementioned embodiment are indicated by the same reference numerals and the description thereof is omitted.

In the projection-type liquid-crystal display of the above-mentioned embodiment 3 wherein the reflection-reducing coating layer 21 is directly laid onto the light-releasing surface of the active-matrix substrate 14b' of the liquid crystal panel 14', however, the following problems tend to be raised.

In the case when the reflection-reducing coating layer 21 is laid onto one surface of the active-matrix substrate 14b' before the semiconductor active device 17 is formed on the other surface, the reflection-reducing coating layer 21 is susceptible to scratches upon formation of the semiconductor active device 17, thereby causing the scratches to form their images on the screen and thus reducing the picture quality. In contrast, in the case when the reflection-reducing coating layer 21 is directly laid on one surface after the semiconductor active device 17 has been formed on the other surface, the semiconductor active device 17 tends to be damaged or the semiconductor active device 17 is adversely affected by electrostatic destruction (ESD); this causes a reduction in the yield. Moreover, in the case when the reflection-reducing coating layer 21 is directly formed on the light-releasing surface of the active-matrix substrate 14b whereon the semiconductor active device 17 has been formed, after completing the liquid crystal panel 14' by bonding the opposing substrate 14a' thereto, the characteristics of the film tend to deteriorate since there is a restriction in the temperature that is applicable to the liquid crystal panel 14', thereby failing to provide a reflection-reducing coating layer 21 with good characteristics.

Here, the present embodiment proposes a projection-type liquid crystal display which is capable of solving the above-mentioned problems and providing a superior reflection-reducing coating layer 21 with superior film characteristics, without having scratches and other defects, at high yield.

As shown in FIG. 14, in a projection-type liquid crystal display of the present embodiment, image-outputting sections 36, 37 and 38 are installed in place of the image-outputting sections 30, 31 and 32 of the projection-type liquid crystal display of the aforementioned embodiment 3.

Here, in the image-outputting sections 36, 37 and 38 also, since they have virtually the same arrangement except for their driving signals in the same manner as the aforementioned embodiment 1, an explanation will be given only on the image-outputting section 36.

The image-outputting section 36 is provided with a liquid crystal panel section 35 in place of the liquid crystal panel section 29 in the image-outputting section 30 in the aforementioned embodiment 3.

As shown in FIG. 15, in the liquid crystal panel section 35, a transparent plate (transparent member) 39, whose light-releasing surface is covered with a reflection-reducing coating layer 21, is bonded to the light-releasing surface of the active-matrix substrate 14b' by the use of an adhesive material (or a bonding layer) 20. Further, a light-releasing-side polarizing element 13b, whose light-incident and light-releasing surfaces are covered with reflection-reducing coating layers 21, is placed on the light-releasing-surface side of the active-matrix substrate 14b' with an air layer $A_2$ located in between. As for materials of the transparent plate 39, any of the following materials or combinations thereof may be used: glass substrate, quartz substrate, film of acetate-cellulose group, film of polyester group, polycarbonate film, and polysulfone film.

In this case also, the thickness of the air layer $A_2$ is set so that the light-releasing-side polarizing element 13b is separated from the display pixel electrodes of the liquid crystal panel 14' beyond the depth of focus of the projection lens 9.

In the image-outputting section 36 having such a liquid crystal panel section 35, the internal reflection on the light-releasing surface (the interface between the active-matrix substrate 14b' and the transparent plate 39) of the active-matrix substrate 14b' is reduced to virtually 0% from the order of 4% that is obtained in the conventional image-outputting section 52 (see FIG. 26) by the use of the transparent plate 39 that has the reflection-reducing coating layer 21 laid on its light-releasing surface and that is bonded to the active-matrix substrate 14b' by the use of the adhesive material 20.

Figure 26:
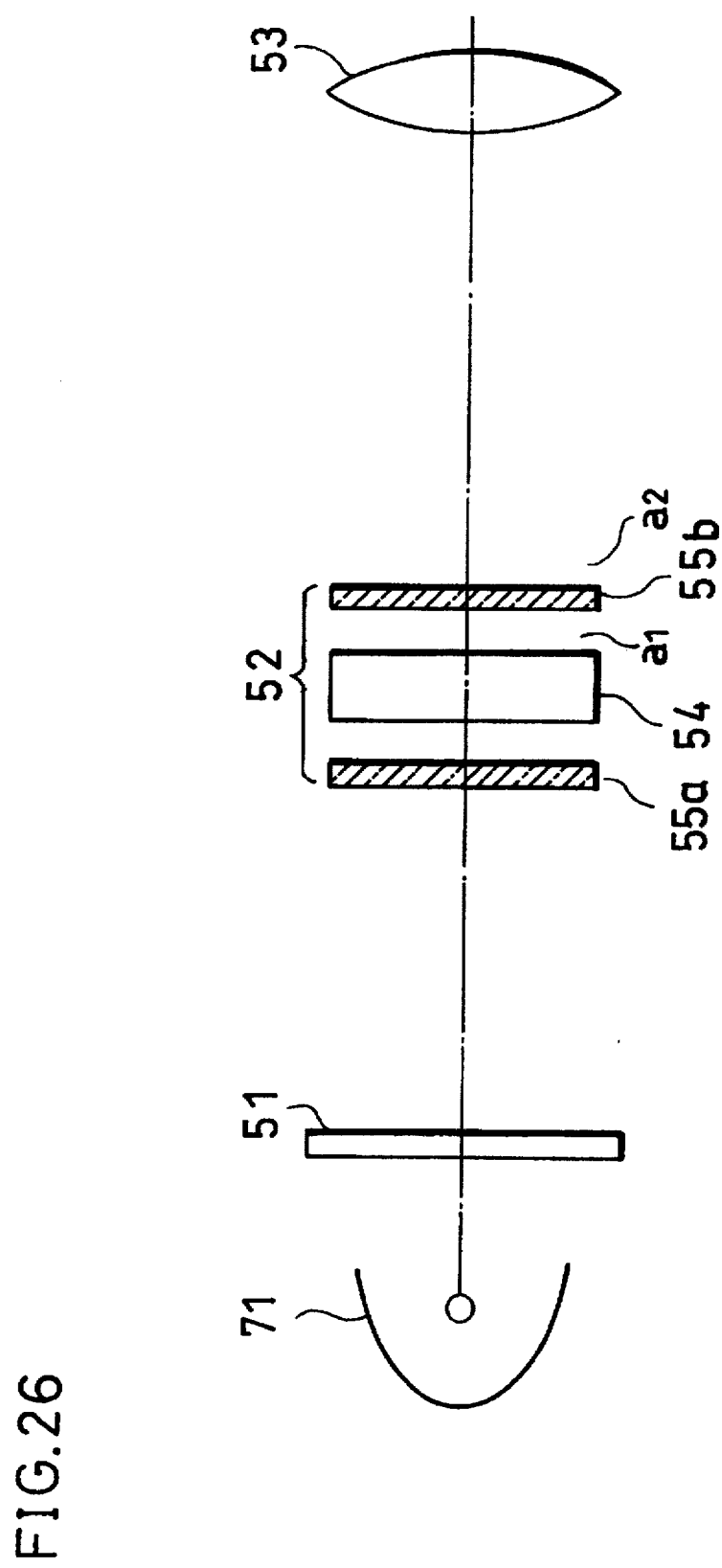
FIG. 26 is a schematic side view of a conventional projection-type liquid crystal display.
Figure 27:
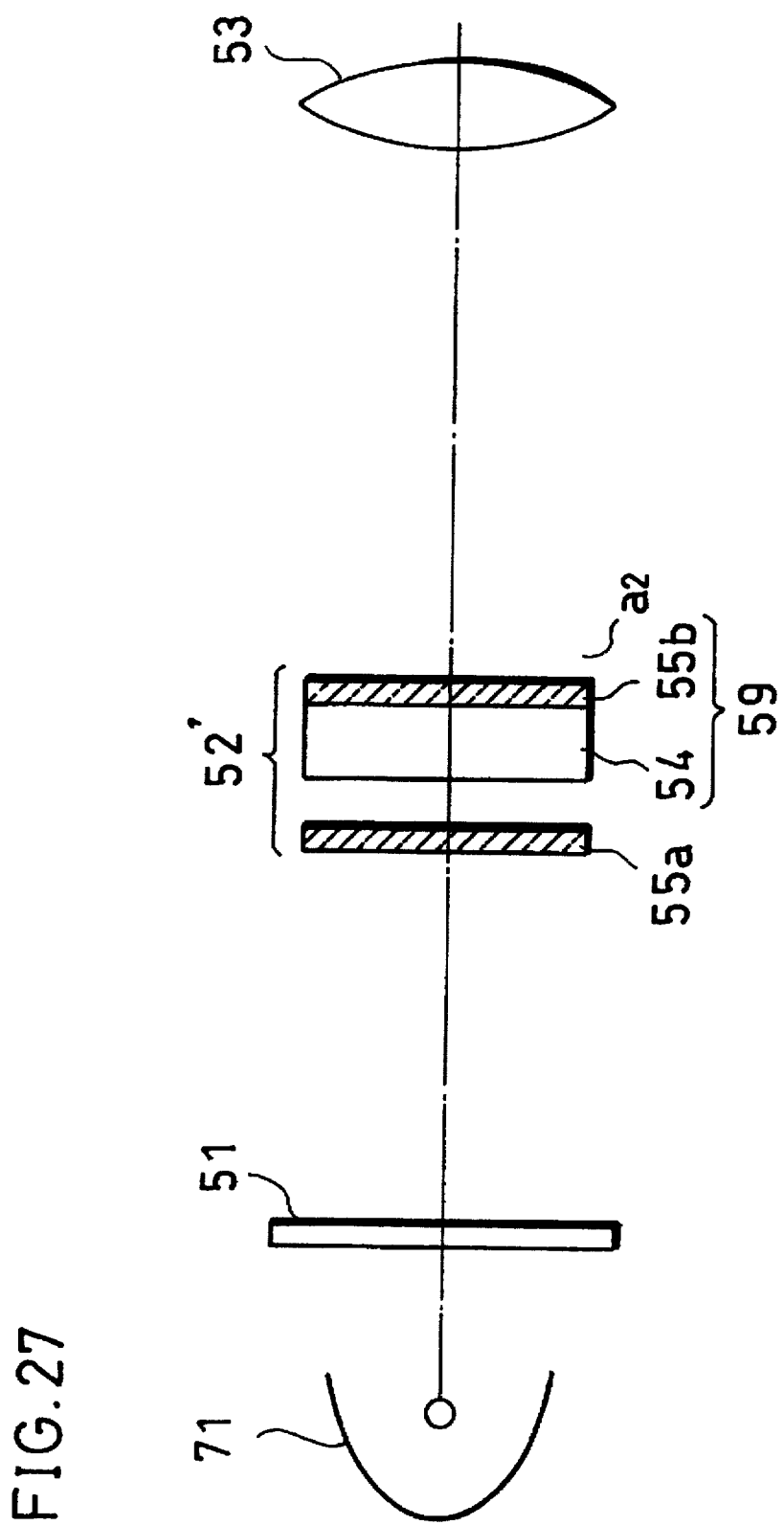
FIG. 27 is a schematic side view of another conventional projection-type liquid crystal display.
Figure 28:
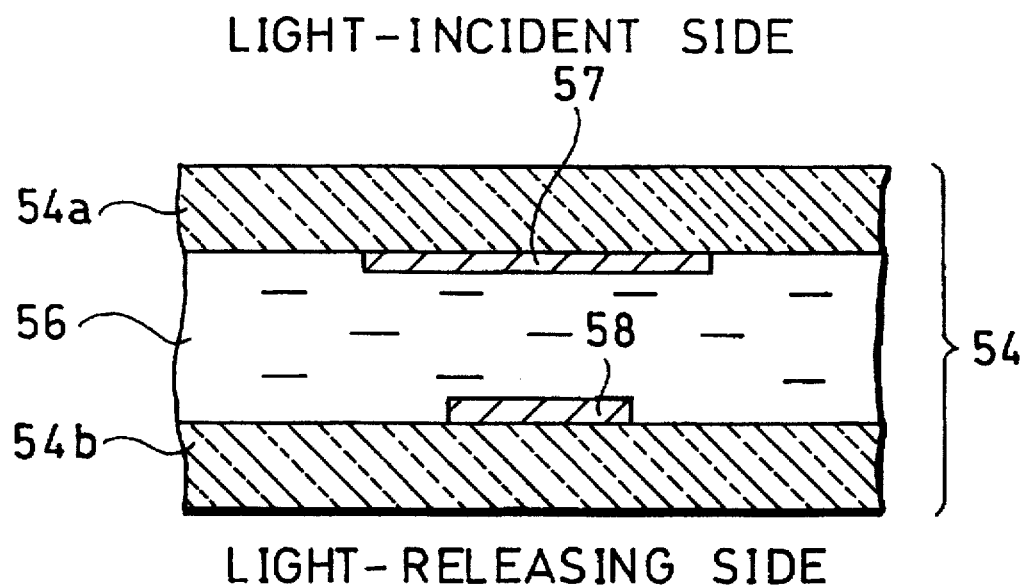
FIG. 28 is a cross-sectional view of an essential part of a conventional liquid-crystal panel.
Figure 29:
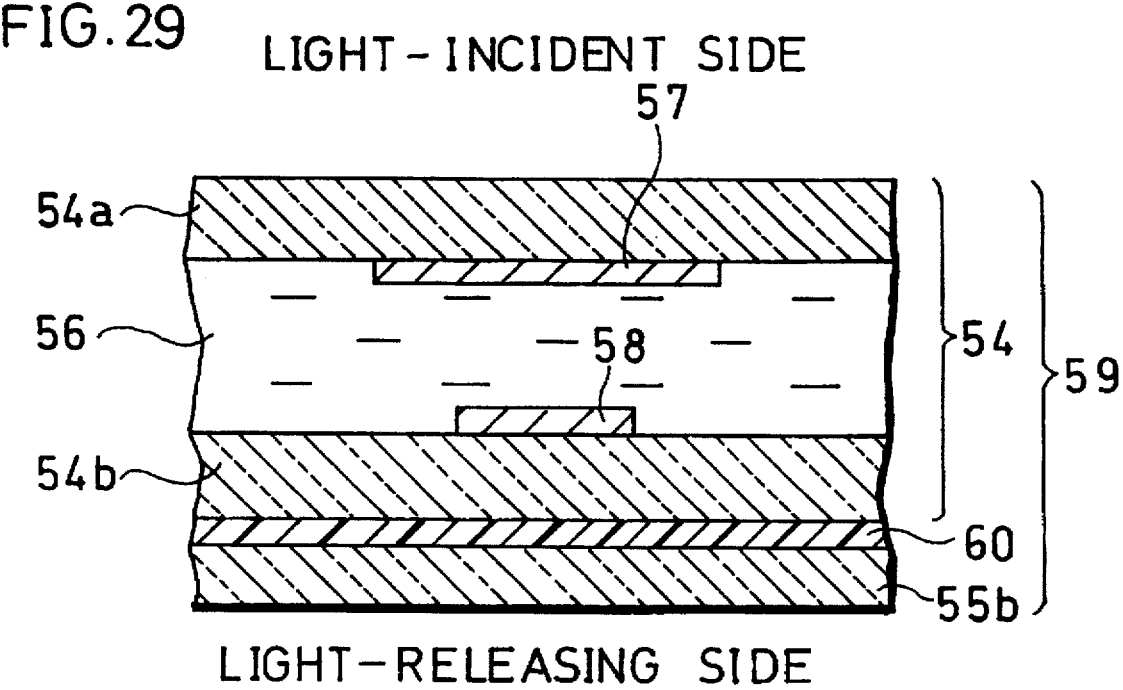
FIG. 29 is a cross-sectional view of an essential part of a liquid-crystal panel section wherein a light-releasing-side polarizing element is bonded to the conventional liquid crystal panel.
Figure 30:
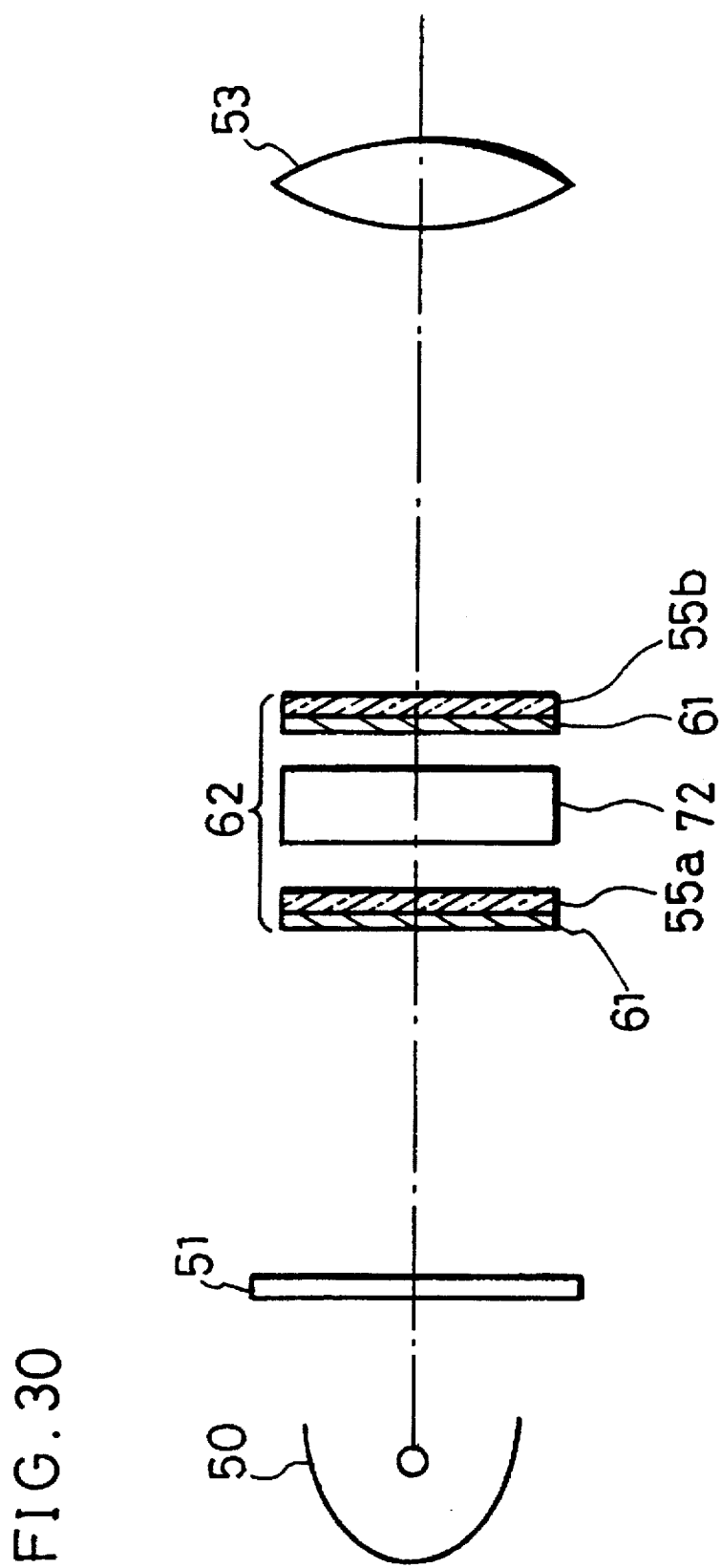
FIG. 30 is a schematic side view of a still another conventional projection-type liquid crystal display.
Figure 31:
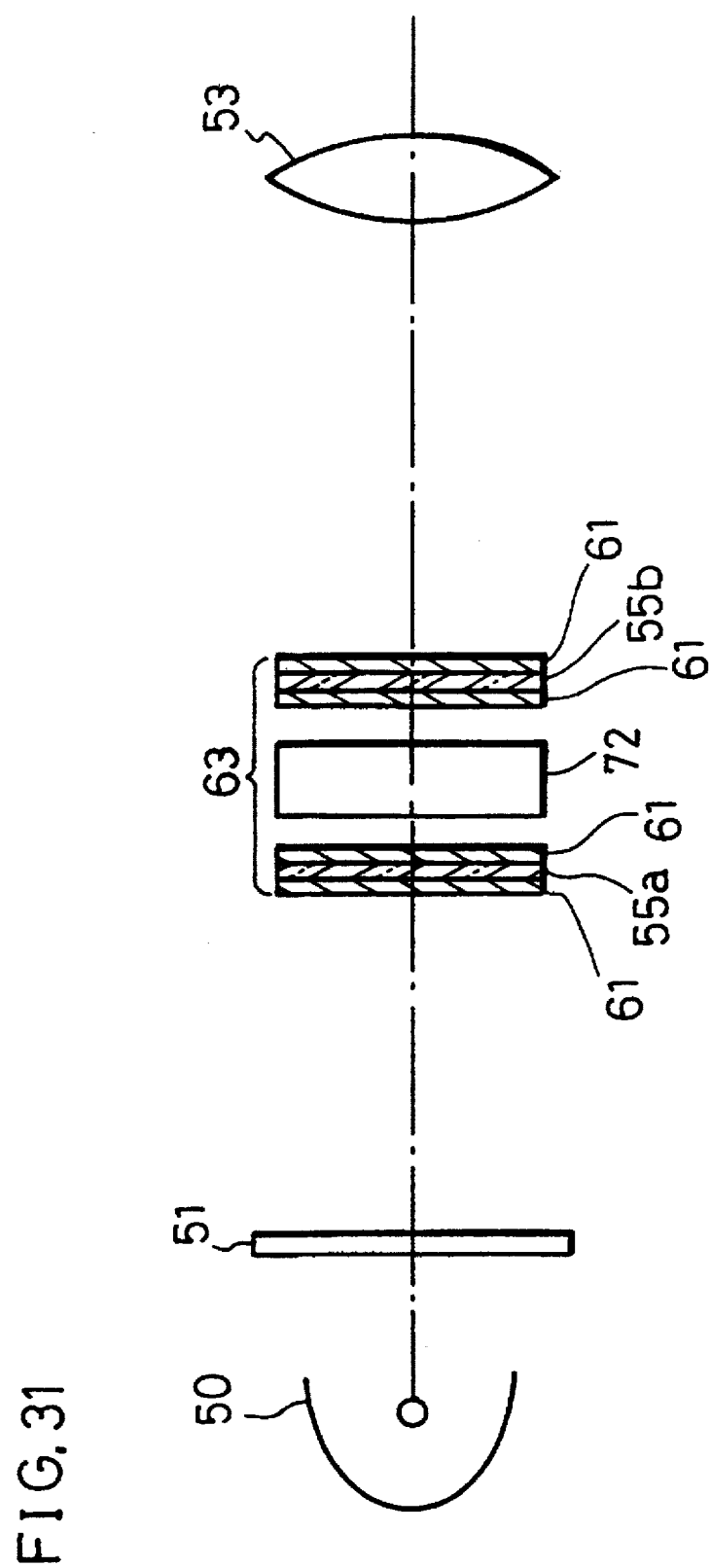
FIG. 31 is a schematic side view of the other conventional projection-type liquid crystal display.

Further, the external reflection on the light-incident surface (the interface between the air layer As and the light-releasing-side polarizing element 13b) of the light-releasing-side polarizing element 13b is reduced to virtually 0% from the order of 3% that is obtained in the conventional image-outputting section 52 (see FIG. 26).

Similarly, the internal reflection on the light-releasing surface (the interface between the light-releasing-side polarizing element 13b and the air layer) of the light-releasing-side polarizing element 13b is restricted to virtually 0% by the use of the reflection-reducing coating layer 21 laid on the light-releasing surface of the light-releasing-side polarizing element 13b.

Moreover, since the display pixel electrodes of the liquid crystal panel 14' and the light-releasing-side polarizing element 13b are separated from each other beyond the depth of focus of the projection lens 9, it becomes possible to prevent defects, such as scratches and flaws, contained in the light-releasing-side polarizing element 13b from being focused to form their images on the screen by the projection lens 9. Thus, the same effects as those of the aforementioned embodiment 3 are obtained.

Furthermore, in the case of the image-outputting section 36, the reflection-reducing coating layer 21 is not directly laid on the light-releasing surface of the active-matrix substrate 14b', but the transparent plate 39 whereon the reflection-reducing coating layer 21 is preliminarily laid is bonded to the active-matrix substrate 14b'. This makes it possible to solve the aforementioned problems that are raised from the direct installation, as well as making it possible to install a good reflection-reducing coating layer 21 having superior film quality without scratches and other defects at high yield.

In the present embodiment also, the projection-type liquid crystal display, which separates light from the light source into the primaries and directs them to the three image-outputting sections 36, 37 and 38, is adopted. However, the present invention is not intended to be limited to this arrangement, and the image-outputting sections having the above-mentioned arrangement may be also adopted in a projection-type liquid crystal display, for example, as shown in FIG. 16.

[EMBODIMENT 5]

Figure 17:
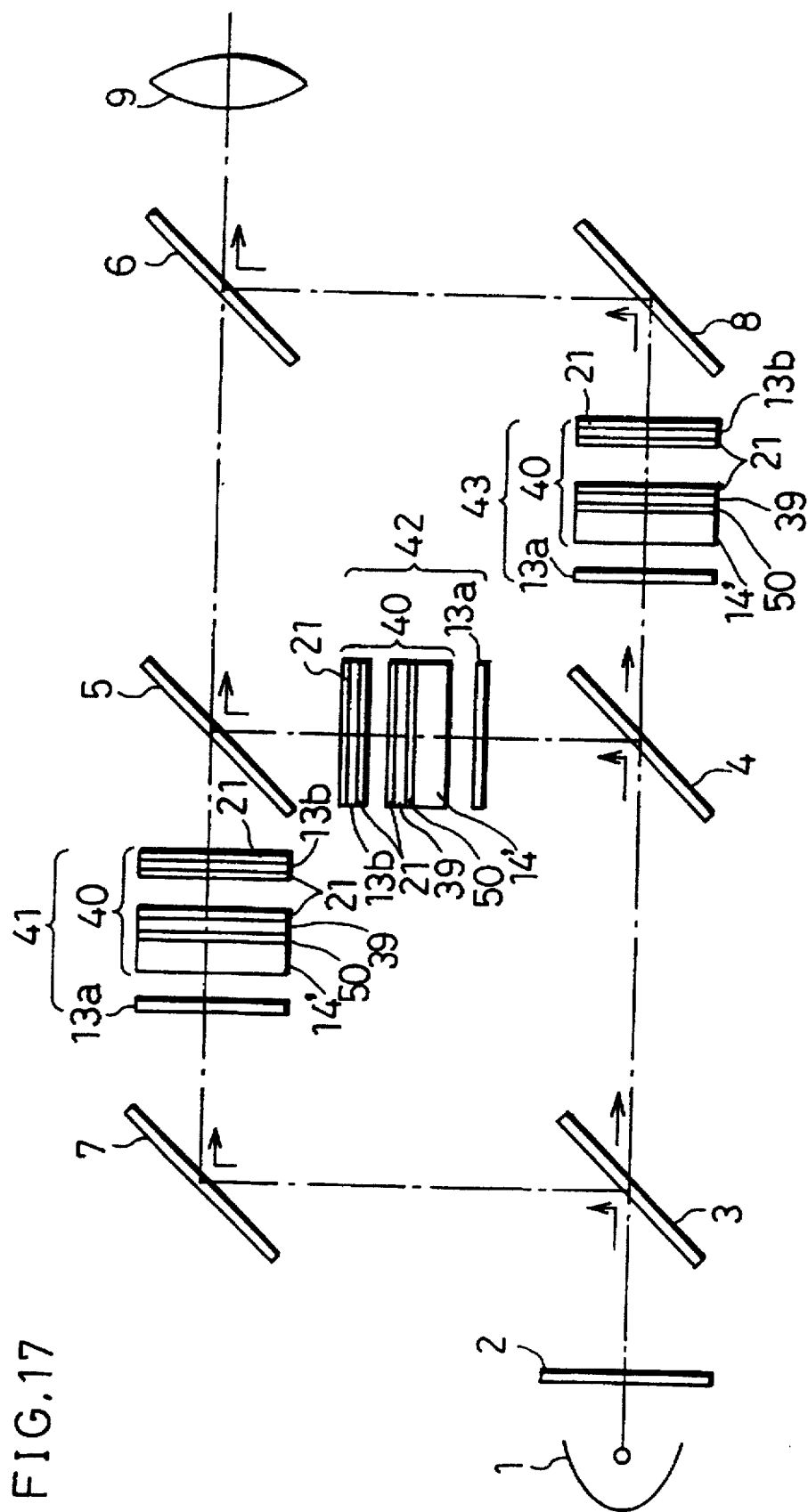
FIG. 17 is a schematic side view of a projection-type liquid crystal display of still another embodiment of the present invention.
Figure 18:
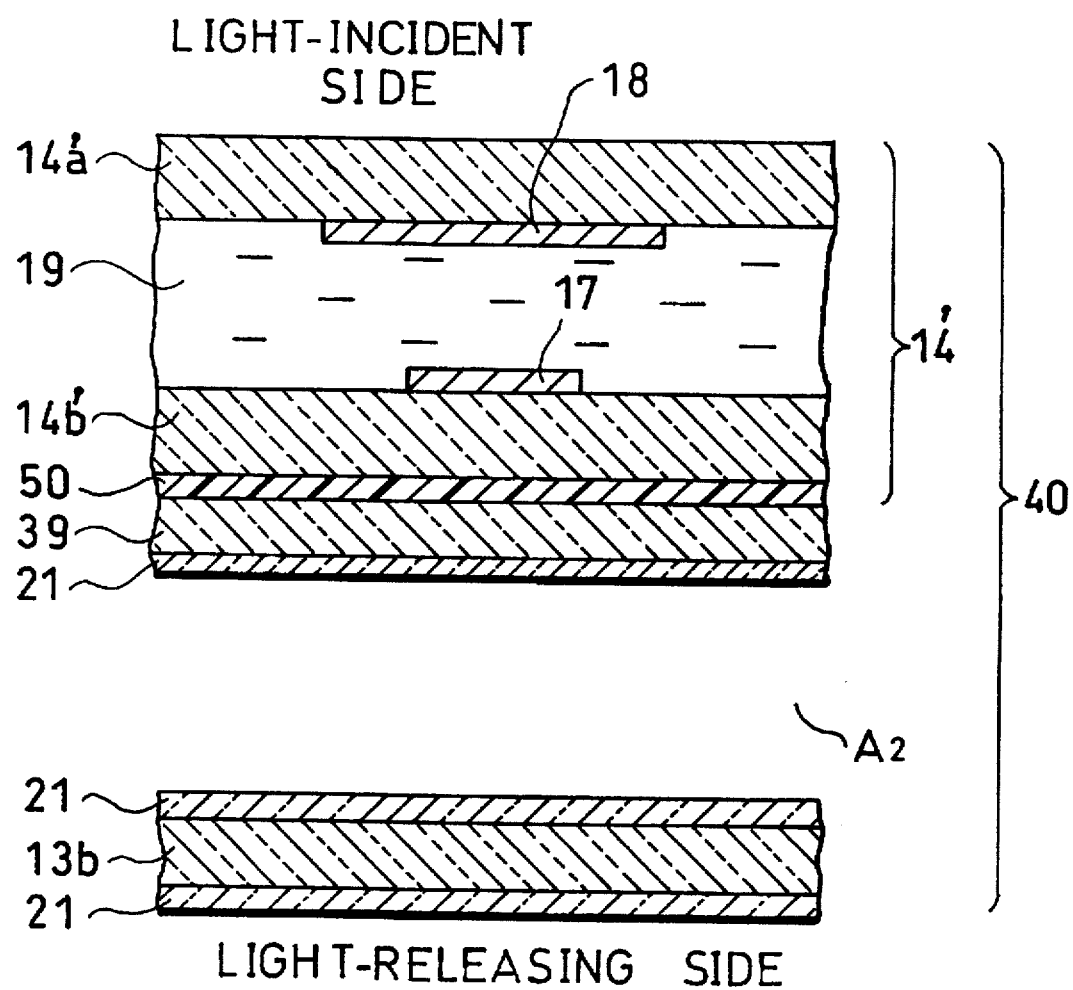
FIG. 18 is a cross-sectional view of an essential part of a liquid-crystal panel section in an image-outputting section that is installed in the projection-type liquid crystal display of FIG. 17.
Figure 19:
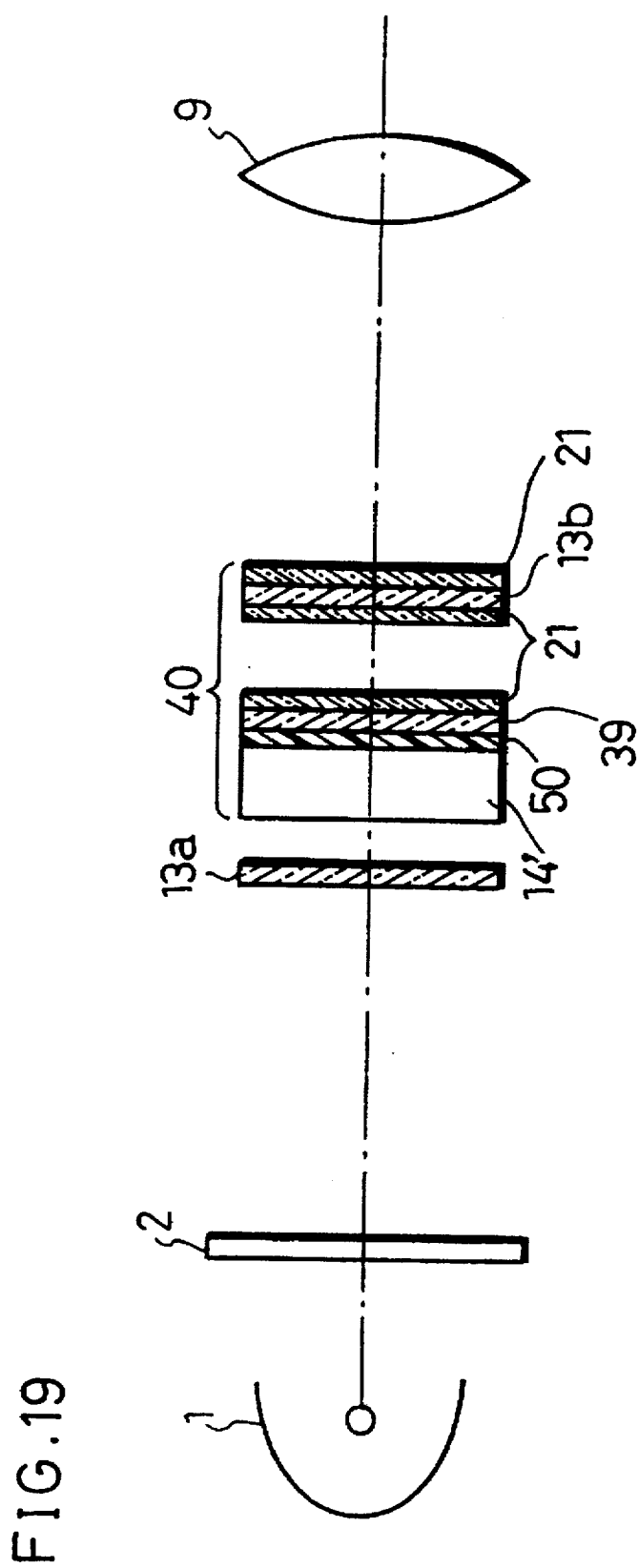
FIG. 19 is a schematic side view of a projection-type liquid crystal display of still another embodiment of the present invention.

Referring to FIGS. 17 through 19, the following description will discuss another embodiment of the present invention. Here, for convenience of explanation, those members that have the same functions and that are described in the aforementioned embodiment are indicated by the same reference numerals and the description thereof is omitted.

In the projection-type liquid crystal display of the above-mentioned embodiment 4 wherein the transparent plate 39 is bonded to the light-releasing surface of the active-matrix substrate 14b' in the liquid crystal panel 14', however, the following problems are raised. Since stress is applied to the active-matrix substrate 14b' when the transparent plate 39 is bonded thereto, the semiconductor active device 17, installed on the opposing substrate-surface, tends to be damaged, and a change tends to occur in the cell gap (the distance between substrates).

In order to solve these problems, the objective of the projection-type liquid crystal display of the present embodiment is to affix the transparent plate 39 without the necessity of applying stress onto the active-matrix substrate 14b'.

As shown in FIG. 17, in a projection-type liquid crystal display of the present embodiment, image-outputting sections 41, 42 and 43 are installed in place of the image-outputting sections 36, 37 and 38 of the projection-type liquid crystal display of the aforementioned embodiment 4.

Here, in the image-outputting sections 41, 42 and 43 also, since they have virtually the same arrangement except for their driving signals in the same manner as the aforementioned embodiment 1, an explanation will be given only on the image-outputting section 41.

The image-outputting section 41 is provided with a liquid crystal panel section 40 in place of the liquid crystal panel section 35 in the image-outputting section 36 in the aforementioned embodiment 4.

As shown in FIG. 18, in the liquid crystal panel section 40, a transparent plate 39, whose light-releasing surface is covered with a reflection-reducing coating layer 21, is affixed to the light-releasing surface of the active-matrix substrate 14b' by the use of a liquid layer 50. The liquid to be used for the liquid layer 50 is selected from isotropic liquids having virtually the same refractive index (approximately 1.5) as the active-matrix substrate 14b' and the transparent plate 39. Here, the liquid layer 50 is shielded along the peripheral side of the substrate so as not to cause leakage.

As described above, in the arrangement wherein the liquid layer 50 is sandwiched in between, the liquid layer 50 serves as a pressure-absorbing medium during the affixing process and a uniform stress is thus applied to the active-matrix substrate 14b'. As a result, it is possible to solve the above-mentioned problems that are raised from the direct bonding process wherein the transparent plate 39 whereon the reflection-reducing coating layer 21 is formed is directly bonded to the active-matrix substrate 14b' by using the adhesive material 20. This arrangement makes it possible prevent damages to the semiconductor active device 17 formed on the active-matrix substrate 14b' and also to prevent a change in the cell gap, thereby providing a good reflection-reducing coating layer 21 having superior film quality without scratches and other defects. Thus, it becomes possible to further improve the picture quality, compared to the projection-type display of the aforementioned embodiment 4.

In the present embodiment also, the projection-type liquid crystal display, which separates light from the light source into the primaries and directs them to the three image-outputting sections 41, 42 and 43, is adopted. However, the present invention is not intended to be limited to this arrangement, and the image-outputting sections having the above-mentioned arrangement may be also adopted in a projection-type liquid crystal display, for example, as shown in FIG. 19.

[EMBODIMENT 6]

Referring to FIGS. 20 through 25, the following description will discuss another embodiment of the present invention. Here, for convenience of explanation, those members that have the same functions and that are described in the aforementioned embodiment are indicated by the same reference numerals and the description thereof is omitted.

In the case of the projection-type liquid crystal display described in the aforementioned embodiments 3, 4 and 5, since the air layer $A_1$ or $A_2$ is provided, liquid crystal panels 14' having a commonly-used substrate-thickness are applicable; however, since the liquid crystal panel 14' and the light-releasing-side polarizing element 13b are not combined into an integral part, it is necessary to assemble the liquid crystal panel 14' and the light-releasing-side polarizing element 13b in a separated manner when they are disposed in the light path of the light source 1. Further, since careful positioning and a predetermined distance adjustment are required when they are disposed, troublesome, time-consuming jobs might be required. Here, in order to solve the above-mentioned problems, the objective of the present embodiment is to improve the operability during the assembling process.

Figure 20:
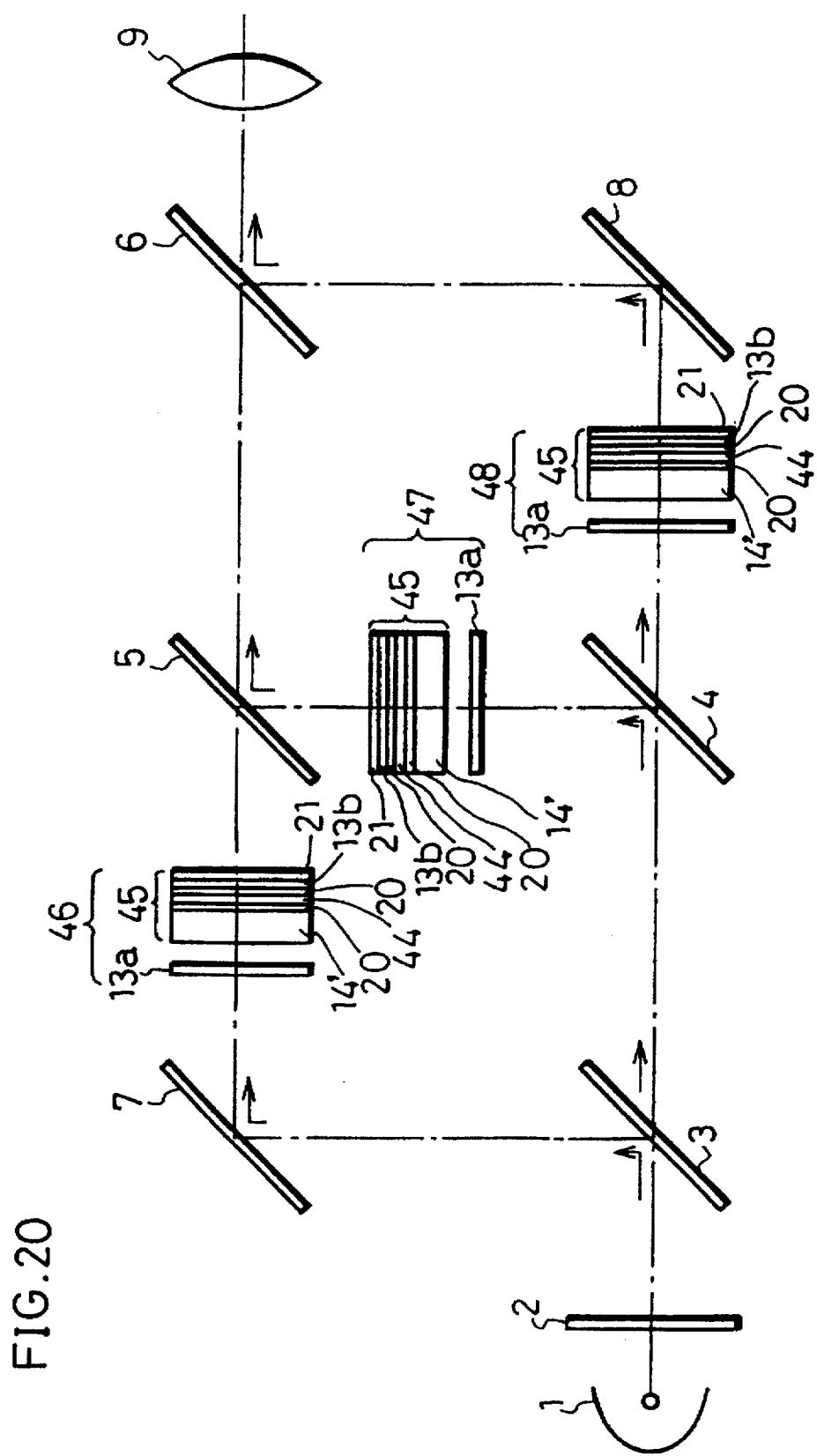
FIG. 20 is a schematic side view of a projection-type liquid crystal display of still another embodiment of the present invention.

As shown in FIG. 20, in a projection-type liquid crystal display of the present embodiment, image-outputting sections 46, 47 and 48 are installed in place of the image-outputting sections 30, 31 and 32 of the projection-type liquid crystal display of the aforementioned embodiment 3.

Here, in the image-outputting sections 46, 47 and 48 also, since they have virtually the same arrangement except for their driving signals in the same manner as the aforementioned embodiment 1, an explanation will be given only on the image-outputting section 46.

The image-outputting section 46 is provided with a liquid crystal panel section 45 in place of the liquid crystal panel section 29 in the image-outputting section 30 in the aforementioned embodiment 3.

Figure 21:
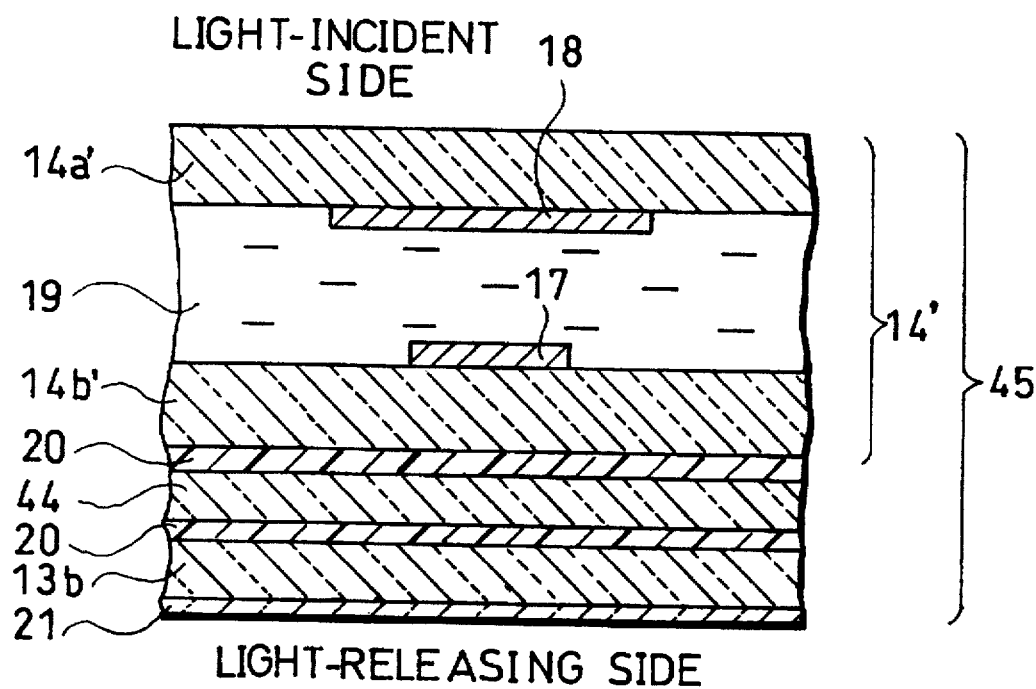
FIG. 21 is a cross-sectional view of an essential part of a liquid-crystal panel section in an image-outputting section that is installed in the projection-type liquid crystal display of FIG. 20.

As shown in FIG. 21, in the liquid crystal panel section 45, a transparent plate (transparent layer) 44, made of a transparent substance having a non-polarizing property, is bonded to the light-releasing surface of the active-matrix substrate 14b' by the use of an adhesive material 20. Further, a light-releasing-side polarizing element 13b is bonded to the light-releasing surface of the transparent plate 44 by the use of the adhesive material 20, and a reflection-reducing coating layer 21 is laid on the light-releasing surface of the light-releasing-side polarizing element 13b that is exposed to air layer.

Here, in this case also, instead of laying the reflection-reducing coating layer 21 directly on the light-releasing surface of the light-releasing-side polarizing element 13b, a transparent non-polarizing substance, whereon the reflection-reducing coating layer 21 is laid, may be bonded thereto. Additionally, as for the materials of the transparent plate 44, those described in the aforementioned embodiments may be adopted.

In the same manner as the setting of the air layer $A_1$ of the aforementioned embodiment 3, the thickness of the transparent plate 44 is set so that the light-releasing-side polarizing element 13b is separated from the display pixel electrodes of the liquid crystal panel 14' beyond the depth of focus of the projection lens 9.

In the image-outputting section 46 having such a liquid crystal panel section 45, the internal reflection on the light-releasing surface (the interface between the active-matrix substrate 14b' and the transparent plate 44) of the active-matrix substrate 14b' is reduced to virtually 0% from the order of 4% that is obtained in the conventional image-outputting section 52 (see FIG. 26), because of the transparent plate 44 that is bonded to the light-releasing surface of the active-matrix substrate 14b' of the liquid crystal panel 14' by the use of the adhesive material 20. Further, the external reflection on the light-incident surface (the interface between the transparent plate 44 and the light-releasing-side polarizing element 13b) of the light-releasing-side polarizing element 13b is reduced to virtually 0% from the order of 3% that is obtained in the conventional image-outputting section 52 (see FIG. 19), because of the transparent plate 44 that is bonded to the light-incident surface of the light-releasing-side polarizing element 13b by the use of the adhesive material 20. Moreover, the internal reflection on the light-releasing surface of the light-releasing-side polarizing element 13b is restricted to virtually 0% by the use of the reflection-reducing coating layer 21 laid on the light-releasing surface of the light-releasing-side polarizing element 13b.

Moreover, since the transparent plate 44 separates the display pixel electrodes of the liquid crystal panel 14' and the light-releasing-side polarizing element 13b from each other beyond the depth of focus of the projection lens 9, it becomes possible to prevent defects, such as scratches and flaws, contained in the light-releasing-side polarizing element 13b, from being focused to form their images on the screen by the projection lens 9. Thus, the same effects as those of the aforementioned embodiment 3 are obtained.

Furthermore, in the image-outputting section 46, the liquid crystal panel 14' and the light-releasing-side polarizing element 13b are integrated into one part. Therefore, different from the arrangement of the aforementioned embodiment 3, there is no need of troublesome and time-consuming jobs even when they are assembled in the light path. As a result, it becomes possible to further improve the work efficiency, compared to the arrangement of the aforementioned embodiment 3.

Figure 22:
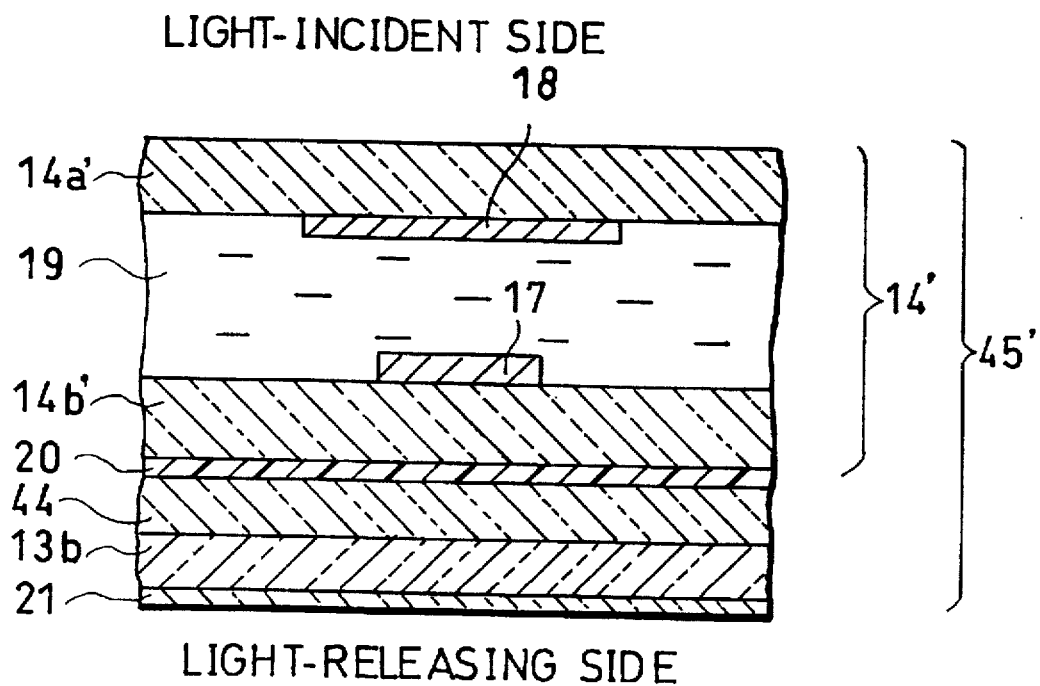
FIG. 22 is a cross-sectional view of an essential part that shows another construction of the liquid-crystal panel section of FIG. 21.

Additionally, in the present embodiment, the transparent plate 44 and the light-releasing-side polarizing element 13b are bonded to each other by using the adhesive material 20. However, another arrangement of the liquid crystal panel 45 may be adopted wherein the transparent plate 44 and the light-releasing-side polarizing element 13b are merely combined in contact with each other without using the adhesive material 20, as shown in FIG. 22. This arrangement also provides the same effects.

Figure 23:
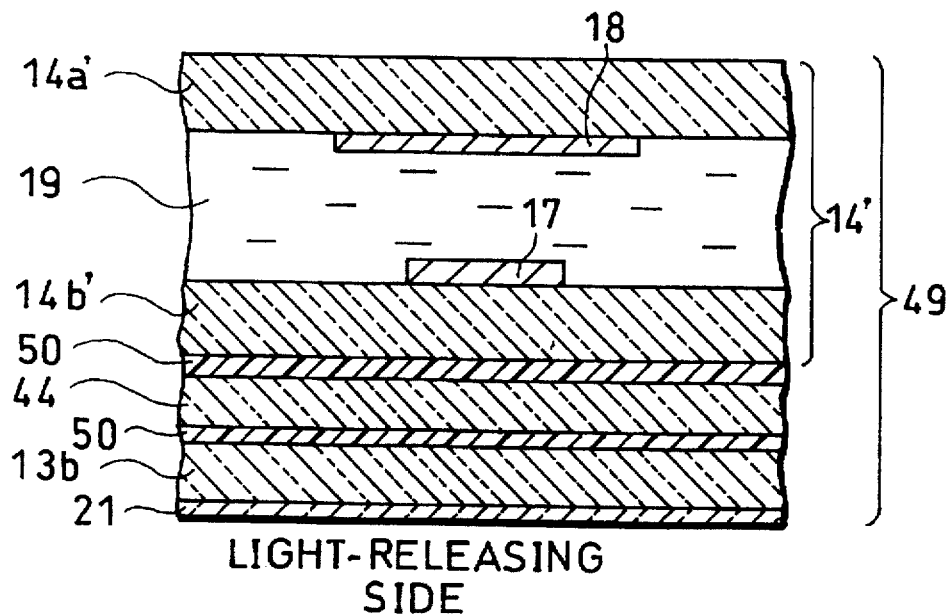
FIG. 23 is a cross-sectional view of an essential part that shows still another construction of the liquid-crystal panel section of FIG. 21.
Figure 24:
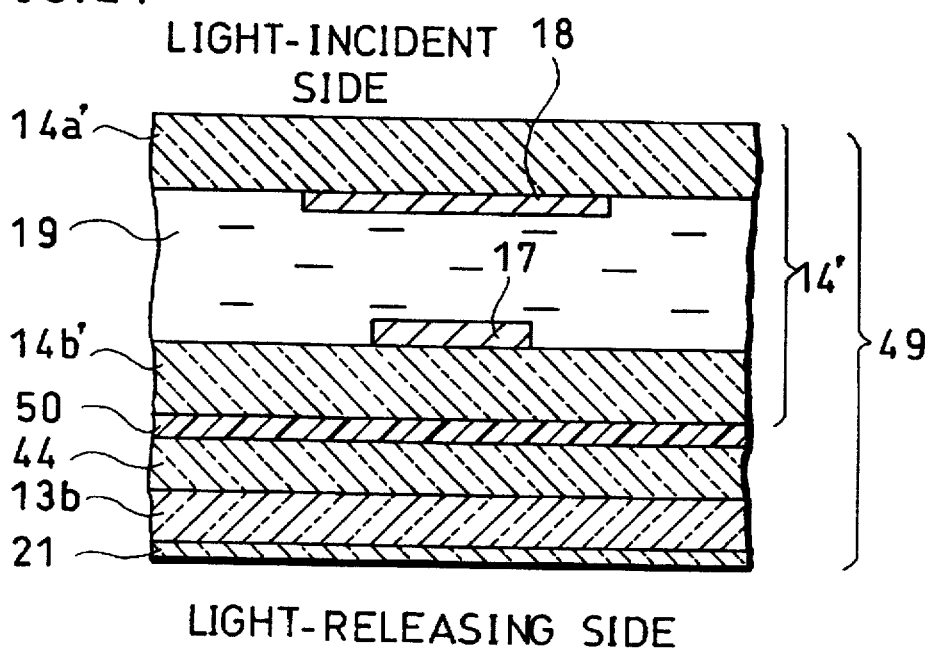
FIG. 24 is a cross-sectional view of an essential part that shows still another construction of the liquid-crystal panel section of FIG. 21.

Moreover, instead of using the adhesive material 20 for bonding the transparent plate 44 to the light-releasing surface of the active-matrix substrate 14b' or for bonding the light-releasing-side polarizing element 13b to the light-releasing surface of the transparent plate 44, the liquid layer 50, whose refractive index is virtually the same as that of the active-matrix substrate 14b', the transparent plate 44 and the light-releasing-side polarizing element 13b, may be used for these purposes as shown in the liquid crystal panel sections 49 and 49' of FIGS. 23 and 24, as has been described in the aforementioned embodiment 5. This arrangement prevents damages to the semiconductor active device 17 installed on the active-matrix substrate 14b', as well as preventing a change in the cell gap, thereby making it possible to obtain the aforementioned effects.

In the cases shown in FIGS. 23 and 24 also, the liquid layer 50 is shielded along the peripheral side of the active-matrix substrate 14b' or the transparent panel 44.

Figure 25:
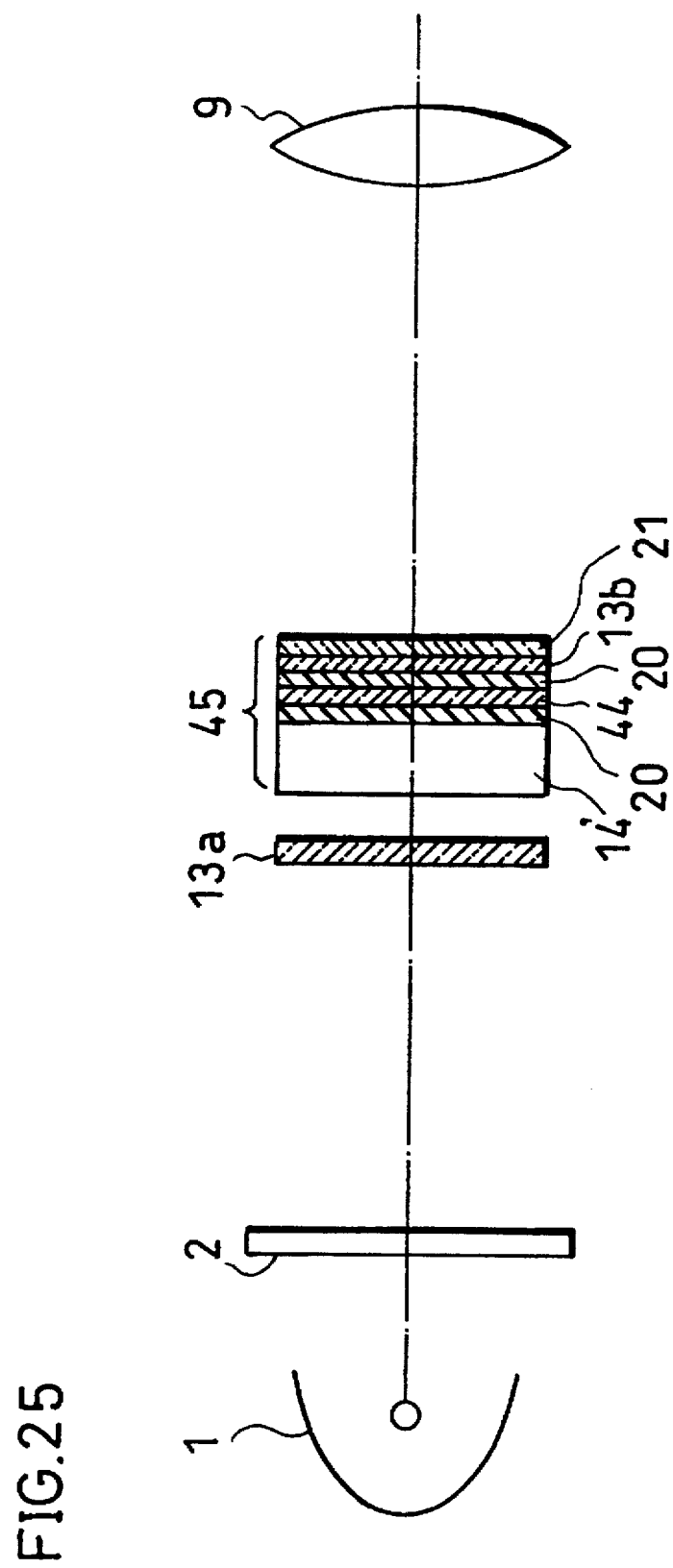
FIG. 25 is a schematic side view of a projection-type liquid crystal display of the other embodiment of the present invention.

In the present embodiment also, the projection-type liquid crystal display, which separates light from the light source into the primaries and directs them to the three image-outputting sections 46, 47 and 48, is adopted. However, the present invention is not intended to be limited to this arrangement, and the image-outputting sections having the above-mentioned arrangement may be also adopted in a projection-type liquid crystal display, for example, as shown in FIG. 25.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A projection-type liquid crystal display, which has a liquid-crystal panel that is constituted of an active-matrix substrate having semiconductor active devices formed thereon, an opposing substrate having opposing electrodes formed thereon, and a liquid crystal layer sandwiched therebetween, and which allows light rays to be incident on the liquid-crystal panel from the opposing substrate side, as well as allowing light rays released from the liquid-crystal panel to pass through a projection lens, so that images displayed on the liquid-crystal panel are projected in an enlarged manner, comprising:

a shading pattern for shielding the light rays that have been incident on the liquid-crystal panel so that they are not directly incident on the semiconductor active devices formed on the active-matrix substrate, the shading pattern being formed in the liquid-crystal panel;

a light-releasing-side polarizing element having a plate shape which is installed in such manner as to adhere to the light-releasing surface of the active-matrix substrate; and a reflection-reducing coating layer directly formed on the light-releasing surface of the light-releasing-side polarizing element.

2. The projection-type liquid crystal display as defined in claim 1, wherein the thickness of the active-matrix substrate is designed so that the light-releasing surface of the active-matrix substrate is allowed to be located apart from display pixel electrodes in the liquid crystal panel with a distance not less than the depth of focus of the projection lens.

3. The projection-type liquid crystal display as defined in claim 1, wherein the thickness of the opposing substrate is designed so that the light-incident surface of the opposing substrate is allowed to be located apart from display pixel electrodes in the liquid crystal panel with a distance not less than the depth of focus of the projection lens.

4. The projection-type liquid crystal display as defined in claim 1, wherein the thickness of the active-matrix substrate is designed so that the light-releasing surface of the active-matrix substrate is allowed to be located apart from display pixel electrodes in the liquid-crystal panel with a distance not less than the depth of focus of the projection lens, said thickness being arranged so that, supposing that the thickness of the active-matrix substrate is d and the area of a pixel aperture section that corresponds to a light-transmitting section in each display pixel in the liquid-crystal panel is a, the thickness d of the active-matrix substrate satisfies an inequality, $d > -0.0016a + 1.26$.

5. The projection-type liquid crystal display as defined in claim 1, wherein the thickness of the opposing substrate is designed so that the light-incident surface of the opposing substrate is allowed to be located apart from display pixel electrodes in the liquid-crystal panel with a distance not less than the depth of focus of the projection lens, said thickness of the opposing substrate being arranged so that, supposing that the thickness of the active-matrix substrate is d and the area of a pixel aperture section that corresponds to a light-transmitting section in each display pixel in the liquid-crystal panel is a, the thickness d of the active-matrix substrate satisfies an inequality, $d > -0.0016a + 1.26$.

6. The projection-type liquid crystal display as defined in claim 1, wherein the thicknesses of the active-matrix substrate and the opposing substrate are designed so that the light-releasing surface of the active-matrix substrate and the light-incident surface of the opposing substrate are respectively allowed to be located apart from display pixel electrodes in the liquid-crystal panel with a distance not less than the depth of focus of the projection lens, said thicknesses of the active-matrix substrate and the opposing substrate being arranged so that, supposing that each of the thicknesses of the active-matrix substrate and the opposing substrate is d and the area of a pixel aperture section that corresponds to a light-transmitting section in each display pixel in the liquid-crystal panel is a, each of the thicknesses d of the active-matrix substrate and the opposing substrate satisfies an inequality, $d > -0.0016a + 1.26$.

7. The projection-type liquid crystal display as defined in claim 1, wherein the light-releasing-side polarizing element is affixed to the light-releasing surface of the active-matrix substrate with a bonding layer that has virtually the same refractive index as that of the active-matrix substrate and the light-releasing-side polarizing device.

8. The projection-type liquid crystal display as defined in claim 1, wherein the semiconductor active device is selected from a group consisting of poly-crystal silicone thin-film transistors of top-gate construction.

9. A projection-type liquid crystal display, which has a liquid crystal panel that is constituted of an active-matrix substance having semiconductor active devices formed thereon, an opposing substrate having opposing electrodes formed thereon, and a liquid crystal layer disposed therebetween, and which allows light rays to be incident on the liquid-crystal panel from the opposing substrate side, as well as allowing light rays released from the liquid-crystal panel to pass through a projection lens, so that images displayed on the liquid crystal panel are projected in an enlarged manner, comprising:

a shading pattern for shielding the light rays that have been incident on the liquid crystal panel so that they are not directly incident on the semiconductor active devices formed on the active-matrix substrate, the shading pattern being formed in the liquid crystal panel;

a light-releasing-side polarizing element having a plate shape which is installed in such a manner as to adhere to the light-releasing surface of the active-matrix substrate; and an anti-reflection section which includes a half-wave plate, affixed to the light-releasing surface of the light-releasing-side polarizing element with a bonding layer.

10. A projection-type liquid crystal display, which has a liquid-crystal panel that is constituted of an active-matrix substrate having semiconductor active devices formed thereon, an opposing substrate having opposing electrodes formed thereon, and a liquid crystal layer sandwiched therebetween, and which allows light rays to be incident on the liquid-crystal panel from the opposing substrate side, as well as allowing light rays released from the liquid-crystal panel to pass through a projection lens, so that images displayed on the liquid-crystal panel are projected in an enlarged manner comprising:

a shading pattern for shielding the light rays that have been incident on the liquid-crystal panel so that they are not directly incident on the semiconductor active devices formed on the active-matrix substrate, the shading pattern being formed in the liquid-crystal panel;

a first reflection-reducing coating layer directly formed on the light-releasing face of the active-matrix substrate;

a plate-shaped light-releasing-side polarizing element that is installed on the light-releasing side of the liquid-crystal panel apart from the active-matrix substrate with an air layer located in between; and a second reflection-reducing costing layer directly formed at least on the light-incident surface of the light-releasing-side polarizing element.

11. The projection-type liquid crystal display as defined in claim 10, wherein the thickness of the air layer is designed so that the light-releasing-side polarizing element is located apart from display pixel electrodes in the liquid-crystal panel with a distance not less than the depth of focus of the projection lens.

12. The projection-type liquid crystal display as defined in claim 10, wherein the semiconductor active device is selected from a group consisting of poly-crystal silicone thin-film transistors of top-gate construction.

13. A projection-type liquid crystal display, which has a liquid crystal panel that is constituted of an active-matrix substance having semiconductor active devices formed thereon, an opposing substrate having opposing electrodes formed thereon, and a liquid crystal layer disposed therebetween, and which allows light rays to be incident on the liquid-crystal panel from the opposing substrate side, as well as allowing light rays released from the liquid-crystal panel to pass through a projection lens, so that images displayed on the liquid crystal panel are projected in an enlarged manner, comprising:

a shading pattern for shielding the light rays that have been incident on the liquid crystal panel so that they are not directly incident on the semiconductor active devices formed on the active-matrix substrate, the shading pattern being formed in the liquid crystal panel;

a light-releasing-side polarizing element having a plate shape which is installed in such a manner as to adhere to the light-releasing surface of the active-matrix substrate; and a first anti-reflection section formed on the light-releasing face of the active-matrix substrate;

a plate-shaped light-releasing-side polarizing element that is installed on the light-releasing side of the liquid-crystal panel apart from the active-matrix substrate with an air layer located in between; and a second anti-reflection section that is formed at least on the light-incident surface of the light-incident surface and the light-releasing surface of the light-releasing-side polarizing element;

wherein the first anti-reflection section includes a transparent member having a non-polarizing property that has a first surface which faces the light-releasing surface of the active-matrix substrate with liquid located in between and a second surface having an anti-reflection film formed thereon, the liquid having virtually the same refractive index as that of the active-matrix substrate and the transparent member.

14. The projection-type liquid crystal device as defined in claim 13, wherein the liquid is selected from a group consisting of isotropic liquids.

15. A projection-type liquid crystal display, which has a liquid-crystal panel that is constituted of an active-matrix substrate having semiconductor active devices formed thereon, an opposing substrate having opposing electrodes formed thereon, and a liquid crystal layer sandwiched therebetween, and which allows light rays to be incident on the liquid-crystal panel from the opposing substrate side, as well as allowing light rays released from the liquid-crystal panel to pass through a projection lens, so that images displayed on the liquid-crystal panel are projected in an enlarged manner, comprising:

a shading pattern for shielding the light rays that have been incident on the liquid-crystal panel so that they are not directly incident on the semiconductor active devices formed on the active-matrix substrate, the shading pattern being formed in the liquid-crystal panel;

a plate-shaped light-releasing-side polarizing element that is installed on the light-releasing side of the liquid-crystal panel;

a non-polarizing transparent layer having a thickness so that the light-releasing-side polarizing element is located apart from display pixel electrodes in the liquid-crystal panel with a distance not less than the depth of focus of the projection lens, the transparent layer being connected to the light-releasing surface of the active-matrix substrate; and a reflection-reducing coating layer directly formed on the light-releasing surface of the light-releasing-side polarizing element.

16. The projection-type liquid crystal display as defined in claim 15, wherein the transparent layer and the light-releasing-side polarizing element are bonded to each other with a bonding layer that has virtually the same refractive index as that of the light-releasing-side polarizing element.

17. The projection-type liquid crystal display as defined in claim 15, wherein the transparent layer and the light-releasing-side polarizing element are in contact with each other.

18. The projection-type liquid crystal display as defined in claim 15, wherein the transparent layer and the active-matrix substrate are connected to each other with a liquid layer located in between, the liquid layer having virtually the same refractive index as that of the active-matrix substrate.

19. The projection-type liquid crystal display as defined in claim 18, wherein the liquid layer is sealed along the peripheral portion of the active-matrix substrate.

20. The projection-type liquid crystal display as defined in claim 15, wherein the transparent layer and the light-releasing-side polarizing element are connected to each other with a liquid layer located in between, said liquid layer having virtually the same refractive index as that of the light-releasing-side polarizing element.

21. The projection-type liquid crystal display as defined in claim 20, wherein the liquid layer is sealed along the peripheral portion of the transparent layer.

22. The projection-type liquid crystal display as defined in claim 15, wherein the semiconductor active device is selected from a group consisting of poly-crystal silicone thin-film transistors of top-gate construction.

23. A projection-type liquid crystal display, which has a liquid crystal panel that is constituted of an active-matrix substance having semiconductor active devices formed thereon, an opposing substrate having opposing electrodes formed thereon, and a liquid crystal layer disposed therebetween, and which allows light rays to be incident on the liquid-crystal panel from the opposing substrate side, as well as allowing light rays released from the liquid-crystal panel to pass through a projection lens, so that images displayed on the liquid crystal panel are projected in an enlarged manner, comprising:

a shading pattern for shielding the light rays that have been incident on the liquid crystal panel so that they are not directly incident on the semiconductor active devices formed on the active-matrix substrate, the shading pattern being formed in the liquid crystal panel;

a light-releasing-side polarizing element having a plate shape which is installed on the light-releasing surface of the active-matrix substrate with a liquid layer being positioned between said light-releasing-side polarizing element and said active-matrix substrate; and an anti-reflection section formed on the light-releasing surface of the light-releasing-side polarizing element, wherein the liquid layer is set to have virtually the same refractive index as those of the active-matrix substrate and the light-releasing-side polarizing element.

* * * * *